United States Patent
Li et al.

(10) Patent No.: US 12,473,465 B2
(45) Date of Patent: Nov. 18, 2025

(54) ULTRAVIOLET RADIATION-CURED PRESSURE SENSITIVE ADHESIVES FROM PLANT OILS OR ANIMAL FATS

(71) Applicant: Oregon State University, Corvallis, OR (US)

(72) Inventors: Kaichang Li, Corvallis, OR (US); Anlong Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 1032 days.

(21) Appl. No.: 17/295,004

(22) PCT Filed: Nov. 18, 2019

(86) PCT No.: PCT/US2019/062037
§ 371 (c)(1),
(2) Date: May 18, 2021

(87) PCT Pub. No.: WO2020/106632
PCT Pub. Date: May 28, 2020

(65) Prior Publication Data
US 2022/0017788 A1    Jan. 20, 2022

Related U.S. Application Data

(60) Provisional application No. 62/770,091, filed on Nov. 20, 2018.

(51) Int. Cl.
| C09J 7/38 | (2018.01) |
| C08G 59/16 | (2006.01) |
| C08K 5/092 | (2006.01) |
| C09J 11/06 | (2006.01) |
| C09J 163/00 | (2006.01) |
| C09J 191/00 | (2006.01) |

(52) U.S. Cl.
CPC ............ *C09J 7/38* (2018.01); *C08G 59/1455* (2013.01); *C08K 5/092* (2013.01); *C09J 11/06* (2013.01); *C09J 163/00* (2013.01); *C09J 191/00* (2013.01)

(58) Field of Classification Search
CPC ... C09J 7/38; C09J 11/06; C09J 163/00; C09J 191/00; C09J 2301/408; C09J 2301/416; C09J 2433/00; C09J 2463/00; C08K 5/092; C08G 59/1455
See application file for complete search history.

(56) References Cited

U.S. PATENT DOCUMENTS

| 3,304,344 | A | 2/1967 | Szawlowski et al. |
| 4,910,287 | A | 3/1990 | McLafferty et al. |
| 5,869,301 | A | 2/1999 | Nghiem et al. |
| 6,121,398 | A | 9/2000 | Wool et al. |
| 6,713,184 | B1 | 3/2004 | Ferencz et al. |
| 7,157,535 | B2 | 1/2007 | Herr et al. |
| 7,772,712 | B2 | 8/2010 | Frayne et al. |
| 7,910,666 | B2 * | 3/2011 | Byers ............... C08G 59/4064 525/50 |
| 8,796,351 | B2 | 8/2014 | Koch |
| 9,315,704 | B2 | 4/2016 | Li et al. |
| 9,441,112 | B2 * | 9/2016 | Sun ................... C09D 191/00 |
| 9,493,693 | B2 | 11/2016 | Li |
| 9,556,368 | B2 | 1/2017 | Li et al. |
| 9,951,260 | B2 | 4/2018 | Li et al. |
| 10,030,182 | B2 | 7/2018 | Li et al. |
| 2002/0188056 | A1 | 12/2002 | Wool et al. |
| 2003/0236425 | A1 | 12/2003 | Herr et al. |
| 2008/0185558 | A1 | 8/2008 | Hein et al. |
| 2008/0220251 | A1 | 9/2008 | Takaki |
| 2013/0089581 | A1 | 4/2013 | Nielsen et al. |
| 2014/0154506 | A1 | 6/2014 | Williams et al. |
| 2014/0342153 | A1 | 11/2014 | Li et al. |
| 2014/0349109 | A1 | 11/2014 | Li et al. |
| 2015/0376468 | A1 | 12/2015 | Cho et al. |
| 2016/0046844 | A1 | 2/2016 | Hammond et al. |
| 2016/0200895 | A1 | 7/2016 | Lipscomb et al. |
| 2016/0253927 | A1 | 9/2016 | Chen et al. |
| 2017/0009103 | A1 | 1/2017 | Li et al. |

(Continued)

FOREIGN PATENT DOCUMENTS

| CN | 103154175 | 6/2013 |
| CN | 104105770 | 10/2014 |
| CN | 104349680 | 2/2015 |

(Continued)

OTHER PUBLICATIONS

Tang et al., "Chapter 8: Bio-Based Epoxy Resin from Epoxidized Soybean Oil," published in *Soybean—Biomass, Yield and Productivity* ed. By Minobu Kasai, 2019.
Extended European Search Report issued for EP Application No. 20815212.4 on Jun. 5, 2023.
Office Action issued for CN Application No. 201980089607.2 on Feb. 27, 2023.

(Continued)

*Primary Examiner* — Scott R. Walshon
(74) *Attorney, Agent, or Firm* — Klarquist Sparkman, LLP

(57) ABSTRACT

A pressure sensitive adhesive construct comprising:
(A) a backing substrate; and
(B) a pressure sensitive adhesive composition disposed on the backing substrate, wherein the pressure sensitive adhesive composition includes an ultraviolet radiation-cured polymer made from:
 (a) at least one epoxidized plant oil, at least one epoxidized animal fat, or a mixture thereof;
 (b) at least one dicarboxylic acid, at least one polycarboxylic acid, or a mixture thereof; and
 (c) at least one compound that contains both one carbon-carbon double bond (C=C) and at least one carboxylic acid group.

20 Claims, No Drawings

(56) References Cited

U.S. PATENT DOCUMENTS

2017/0009104 A1  1/2017  Koch et al.
2020/0079957 A1  3/2020  Huang et al.

FOREIGN PATENT DOCUMENTS

| CN | 105518039 | | 4/2016 |
|---|---|---|---|
| CN | 107400498 | A | 11/2017 |
| EP | 1854442 | | 11/2007 |
| GB | 1 298 325 | | 11/1972 |
| JP | 58001739 | A | 1/1983 |
| WO | WO 2001/037991 | | 5/2001 |
| WO | WO 2008/144703 | | 11/2008 |
| WO | WO 2012/024301 | | 2/2012 |
| WO | WO 2013/154610 | | 10/2013 |
| WO | WO 2015/034864 | | 3/2015 |
| WO | WO 2020/092568 | | 5/2020 |
| WO | WO 2020/106632 | | 5/2020 |
| WO | WO 2020/243559 | | 12/2020 |

OTHER PUBLICATIONS

Govindarajan et al., "A hydrophilic coumarin-based polyester for ambient-temperature initiator-free 3D printing: Chemistry, rheology and interface formation," *Polymer*, vol. 152, pp. 9-17, Sep. 12, 2018.

International Search Report and Written Opinion issued for International Application No. PCT/US2020/035305 on Oct. 19, 2020.

U.S. Appl. No. 17/288,446, filed Apr. 23, 2021.

Zhao et al., "High Performance and Thermal Processable Dicarboxylic Acid Cured Epoxidized Plant Oil Resins through Dynamic Vulcanization with Poly(lactic acid)," *ACS Sustainable Chem. Eng.*, 5(2): 1938-1947, Dec. 21, 2016.

Asahara et al., "Crosslinked acrylic pressure-sensitive adhesives. I. Effect of the crosslinking reaction on the peel strength," *J. Appl. Poly. Sci.*, 87(9): 1493-1499, Dec. 23, 2002.

Baumann et al., "Natural Fats and Oils—Renewable Raw Materials for the Chemical Industry," *Angew. Chem. Int. Ed. Engl.* 27:41-62, Jan. 1988.

Biermann et al., "New Syntheses with Oils and Fats as Renewable Raw Materials for the Chemical Industry," *Angew. Chem. Int. Ed.* 39:2206-2224, Jul. 4, 2000.

Bunker et al., "Miniemulsion polymerization of acrylated methyl oleate for pressure sensitive adhesives," *International Journal of Adhesion & Adhesives*, 23(1): 29-38, Feb. 14, 2003.

Bunker et al., "Synthesis and characterization of monomers and polymers for adhesives from methyl oleate," *Journal of Polymer Science Part A: Polymer Chemistry*, 40(4): 451-458, Jan. 4, 2002.

Clark et al., "Synthesis and properties of polyesters from waste grapeseed oil: comparison with soybean and rapeseed oils," *J. Polym. Environ.*, vol. 25, pp. 1-10, 2017.

International Search Report and Written Opinion issued for International Application No. PCT/US2019/062037 on Feb. 5, 2020.

International Search Report and Written Opinion of the International Searching Authority for International Application No. PCT/US2011/039450, dated Aug. 2, 2012.

Liu et al., "Solid freeform fabrication of epoxidized soybean oil/epoxy composite with bis or polyalkyleneamine curing agents," *Composites* Part A 38(1):87-93, Jan. 2007.

Meier et al., "Plant oil renewable resources as green alternatives in polymer science," *Chemical Society Reviews* vol. 36, pp. 1788-1802, Jul. 23, 2007.

Merfeld et al., "Acid/epoxy reaction catalyst screening for low temperature (120° C.) powder coatings," *Progress in Organic Coatings* 52(2):98-109, Feb. 1, 2005.

Metzger et al., "Lipids as renewable resources: current state of chemical and biotechnological conversion and diversification," *Appl Microbiol Biotechnol* 71:13-22, Apr. 8, 2006.

Shogren et al., "Biodegradation Behavior of Some Vegetable Oil-based Polymers," *Journal of Polymers and the Environment* 12(3):173-178, Jul. 2004.

Extended European Search Report issued for EPC Application No. 19886681.6 on Jun. 28, 2022.

Li et al., "Pressure-sensitive adhesives based on soybean fatty acids," *RSC Advances*, 41(4): 21521-21530, May 6, 2014.

Li et al., "Pressure-sensitive adhesives based on epoxidized soybean oil and dicarboxylic acids," *ACS Sustainable Chemistry & Engineering*, vol. 2, pp. 2090-2096, Jul. 18, 2014.

\* cited by examiner

ULTRAVIOLET RADIATION-CURED PRESSURE SENSITIVE ADHESIVES FROM PLANT OILS OR ANIMAL FATS

This is the U.S. National Stage of International Application No. PCT/US2019/062037, filed Nov. 18, 2019, which was published in English under PCT Article 21(2), which application in turn claims the benefit of U.S. Provisional Application No. 62/770,091, filed Nov. 20, 2018, which application is incorporated herein by reference in its entirety.

BACKGROUND

Pressure sensitive adhesives (PSAs) are adhesives that are permanently tacky at room temperature and readily form adhesive bonds with a variety of adherends when light pressure is applied. No solvent, heat or radiation is needed to activate the PSAs. Therefore, the PSAs are convenient to use and thus find applications in a wide variety of products such as PSA tapes, labels and protective films.

Currently, the majority of commercial PSAs are made from non-renewable petrochemicals such as 2-ethylhexyl acrylate and butyl acrylate. Recently, PSAs from renewable vegetable oils have also been reported or disclosed (see, e.g., U.S. Pat. Nos. 8,796,351, 9,315,704 and 9,556,368), which are prepared with the following approaches. One approach is based on cationic polymerization. In this approach, vegetable oils or their derivatives, fatty acid esters, are first epoxidized; the epoxidized products are then cationically polymerized or copolymerized with vinylethers or epoxy-containing oligomers to give PSAs (see U.S. Pat. No. 8,796,351).

Another approach of making vegetable oil-based PSAs is based on radical polymerization. In this approach, free-radically polymerizable acrylate groups are first introduced onto vegetable oils, fatty acid or fatty acid esters, which accomplished by reacting epoxidized fatty acid esters or epoxidized vegetable oils with acrylic acid, or by reacting fatty acid with glycidyl methacrylate. The resulting acrylated epoxidized fatty acid esters or acrylated epoxidized vegetable oils are then copolymerized with acrylate monomers or low molecular weight acrylic copolymers containing acrylate groups to give PSAs (see U.S. Pat. No. 8,796,351). It has also been studied that acrylated epoxidized methyl oleate (AMO, a typical acrylated fatty acid ester) can be radically polymerized via emulsion polymerization to give (co)polymers that can perform as PSAs (see references 1 and 2). Because AMO is a highly water-insoluble monomer, it is required that water soluble acrylic acid is added into the emulsion to copolymerize AMO. In addition, the PSA based on the polymer of AMO has low tack and insufficient cohesive strength. Therefore, a significant amount (more than 10 wt % of the total monomers) of comonomers, methyl methacrylate and 1,4-butanediol diacrylate, are needed to copolymerize AMO to give PSAs with decent tack values and/or sufficient cohesive strength. The above approach of making the vegetable oil-based PSAs is considered as an extension of traditional free radical polymerization methods. The resulting PSA polymers still belong to "polyacrylates or acrylate polymers" that have carbon-carbon backbone generated via chain-growth polymerization (also known as addition polymerization) of the carbon-carbon double bonds of acrylate monomers.

Still another approach of making vegetable oil-based PSAs is disclosed in U.S. Pat. Nos. 9,315,704 and 9,556,368. In this approach, epoxidized vegetable oils (EVO) and dicarboxylic acids/polycarboxylic acids are first polymerized via the reaction of the epoxy group of EVO and —COOH of the dicarboxylic acids/polycarboxylic acids to give prepolymers. The prepolymers are then further thermally cured to give PSAs via the same reaction between the epoxy and —COOH groups, which requires a typical cure time of from minutes to hours depending on curing temperature. The long curing time could be a bottleneck in the manufacture of the PSAs.

SUMMARY

Disclosed herein is a pressure sensitive adhesive construct comprising:
  (A) a backing substrate; and
  (B) a pressure sensitive adhesive composition disposed on the backing substrate, wherein the pressure sensitive adhesive composition includes an ultraviolet radiation-cured polymer made from:
    (a) at least one epoxidized plant oil, at least one epoxidized animal fat, or a mixture thereof;
    (b) at least one dicarboxylic acid, at least one polycarboxylic acid, or a mixture thereof; and
    (c) at least one compound that contains both one carbon-carbon double bond (C=C) and at least one carboxylic acid group.

Also disclosed herein is a pressure sensitive adhesive construct comprising:
  (A) a backing substrate; and
  (B) a pressure sensitive adhesive composition disposed on the backing substrate, wherein the pressure sensitive adhesive composition includes an ultraviolet radiation-cured semi-interpenetrating polymer network made from a blend of:
    (a) at least one compound containing at least two acrylate or methacrylate groups;
    (b) a photoinitiator; and
    (c) a polyester prepared from polymerization of at least one monocarboxylic acid modified-epoxidized plant oil with at least one dicarboxylic acid or polycarboxylic acid.

Further disclosed herein is a pressure sensitive adhesive construct comprising:
  (A) a backing substrate; and
  (B) a pressure sensitive adhesive composition disposed on the backing substrate, wherein the pressure sensitive adhesive composition includes an ultraviolet radiation-cured polymer having a structure of:

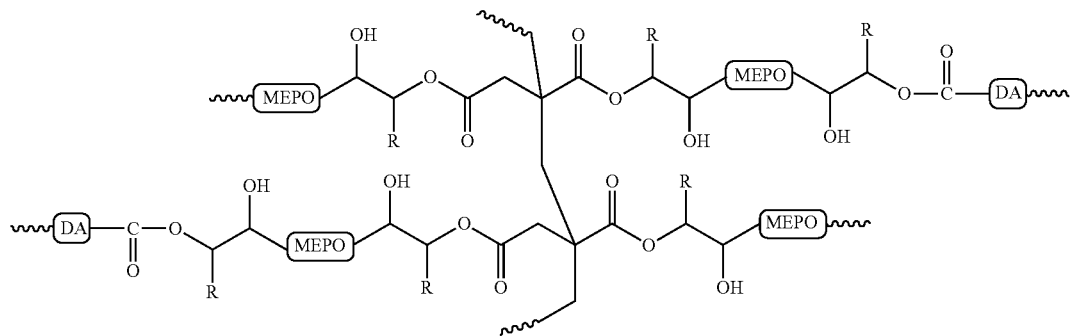

or

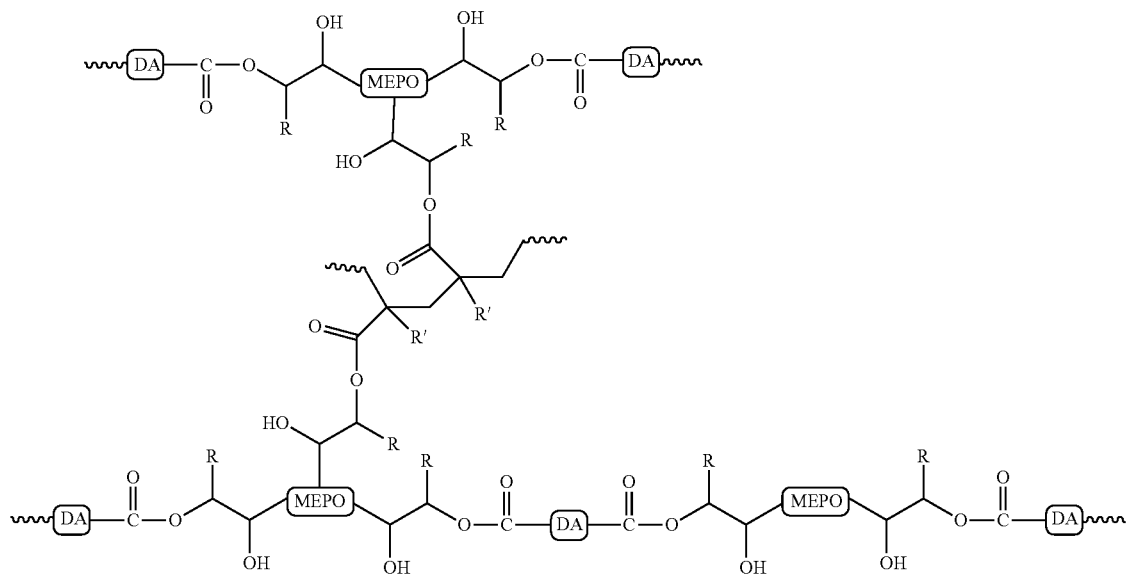

wherein MEPO denotes structure derived from an epoxidized plant oil or modified epoxidized plant oil; DA denotes structure derived from a dicarboxylic acid or polycarboxylic acid; each R' is independently H or methyl group; each R is independently an alkyl derived from a part of fatty acid chains from the epoxidized plant oil or the modified epoxidized plant oil; and each ᴡᴡᴡ represents independently a segment of a polyester chain.

Additionally disclosed herein is a pressure sensitive adhesive composition comprising an ultraviolet radiation-cured polymer made from:

(a) at least one epoxidized plant oil, at least one epoxidized animal fat, or a mixture thereof;

(b) at least one dicarboxylic acid, at least one polycarboxylic acid, or a mixture thereof; and (c) at least one compound that contains both one carbon-carbon double bond (C═C) and at least one carboxylic acid group.

Also disclosed herein is a pressure sensitive adhesive composition comprising a polymer having a structure of:

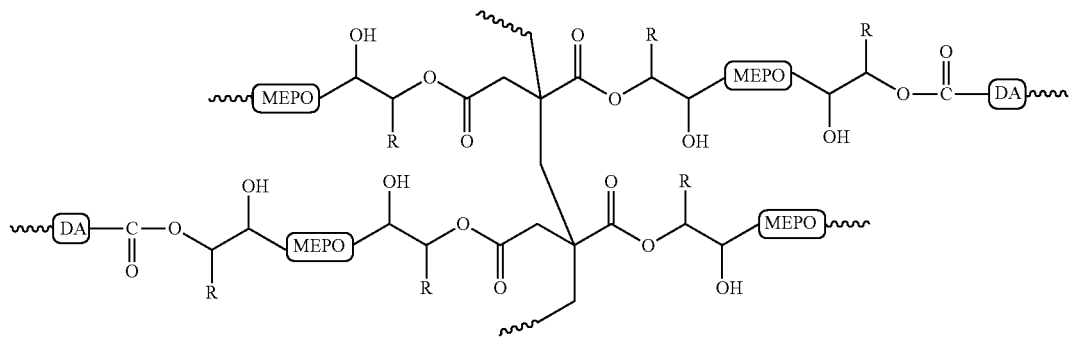

or

-continued

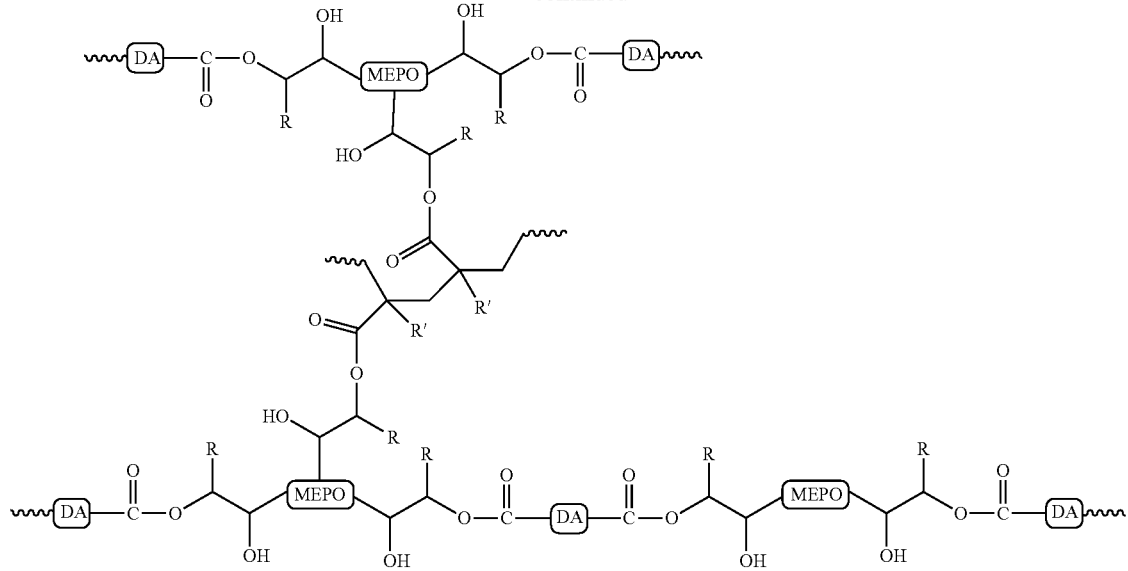

wherein MEPO denotes structure derived from an epoxidized plant oil or modified epoxidized plant oil; DA denotes structure derived from a dicarboxylic acid or polycarboxylic acid; each R' is independently H or methyl group; each R is independently an alkyl derived from a part of fatty acid chains from the epoxidized plant oil or the modified epoxidized plant oil; and each ᴧᴧᴧ represents independently a segment of a polyester chain.

Further disclosed herein is an ultraviolet radation-curable composition comprising:

(a) at least one epoxidized plant oil, at least one epoxidized animal fat, or a mixture thereof;

(b) at least one dicarboxylic acid, at least one polycarboxylic acid, or a mixture thereof;

(c) at least one compound that contains both one carbon-carbon double bond (C=C) and at least one carboxylic acid group; and (d) at least one photoinitiator.

Also disclosed herein is a method comprising:

polymerizing (a) at least one epoxidized plant oil, at least one epoxidized animal fat, or a mixture thereof, (b) at least one dicarboxylic acid, at least one polycarboxylic acid, or a mixture thereof, and (c) at least one compound that contains both one carbon-carbon double bond (C=C) and at least one carboxylic acid group;

adding at least one photoinitiator; and subjecting the resulting resin to ultraviolet radiation to form a crosslinked polymer.

Further disclosed herein is a method for making a crosslinked polyester comprising:

step-growth polymerizing (a) at least one epoxidized plant oil, at least one epoxidized animal fat, or a mixture thereof, (b) at least one dicarboxylic acid, at least one polycarboxylic acid, or a mixture thereof, and (c) at least one compound that contains both one carbon-carbon double bond (C=C) and at least one carboxylic acid group to form a polyester that includes pendant C=C bonds; adding at least one photoinitiator; and subjecting the resulting resin to ultraviolet radiation to form a crosslinked polyester.

DETAILED DESCRIPTION

The term "pressure sensitive adhesive" as used herein refer to adhesives that possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 6 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, alkenyl, or carboxyl. For example, a lower alkyl or $(C_1-C_6)$alkyl can be methyl, ethyl, propyl, isopropyl, butyl, iso-butyl, sec-butyl, pentyl, 3-pentyl, or hexyl; $(C_3-C_6)$cycloalkyl can be cyclopropyl, cyclobutyl, cyclopentyl, or cyclohexyl; $(C_3-C_6)$cycloalkyl$(C_1-C_6)$alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl; $(C_1-C_6)$alkoxy can be methoxy, ethoxy, propoxy, isopropoxy, butoxy, isobutoxy, sec-butoxy, pentoxy, 3-pentoxy, or hexyloxy; $(C_2-C_6)$alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl; $(C_2-C_6)$alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; $(C_1-C_6)$ alkanoyl can be acetyl, propanoyl or butanoyl; halo$(C_1-C_6)$ alkyl can be iodomethyl, bromomethyl, chloromethyl, fluoromethyl, trifluoromethyl, 2-chloroethyl, 2-fluoroethyl, 2,2, 2-trifluoroethyl, or pentafluoroethyl; hydroxy($C_1$-$C_6$)alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl; ($C_1$-$C_6$)alkoxycarbonyl can be methoxycarbonyl, ethoxycarbonyl, propoxycarbonyl, isopropoxycarbonyl, butoxycarbonyl, pentoxycarbonyl, or hexyloxycarbonyl; ($C_1$-$C_6$)alkylthio can be methylthio, ethylthio, propylthio, isopropylthio, butylthio, isobutylthio, pentylthio, or hexylthio; ($C_2$-$C_6$) alkanoyloxy can be acetoxy, propanoyloxy, butanoyloxy, isobutanoyloxy, pentanoyloxy, or hexanoyloxy.

Disclosed herein in one embodiment are ultraviolet radiation (UV)-cured PSAs that are made from (a) at least one epoxidized plant oil, at least one epoxidized animal fat, or a mixture thereof, (b) at least one dicarboxylic acid, at least one polycarboxylic acid, or a mixture thereof, and (c) a small amount of at least one compound that contains both one carbon-carbon double bond (C=C) and at least one carboxylic acid group. Preferably, the compound (c) should have electron-withdrawing groups, for example, ester, carboxylic acid, amide and nitrile groups, conjugated to the C=C bond, so that the C=C bond can readily polymerize when initiated with free radical species. Also disclosed in this invention are methods of making the UV-cured PSAs.

The PSAs disclosed herein are polyesters that are formed from step-growth polymerization of modified epoxidized plant oils with dicarboxylic acid/polycarboxylic acids via the reaction between epoxy and carboxylic acid groups (—COOH). A characteristic of the polyesters is a significant number of ester groups in the polymer backbone, and a small amount of pendant C=C groups (see, for example, the first structure shown in Scheme 1 below).

The number of ester groups per polymer molecule can be from 2 to 500, preferably from 5 to 100. The average number of pendant C=C groups per polymer molecule can be from 0.05 to 2, preferably from 0.2 to 1. The pendant C=C groups are introduced into the polyester as a site for generating cross-links in the subsequent UV curing process resulting in PSA polymers with sufficient cohesion strength (see, for example, the second structure shown in Scheme 1 below). As described below in more detail, disclosed herein are at least two approaches of introducing C=C bonds into the polyesters. In one approach (Scheme 1), the C=C bond is directly introduced into the polyester by copolymerizing a small amount of a C=C containing compound such as itaconic acid with the mixture of epoxidized plant oil (EPO) or modified epoxidized plant oil and dicarboxylic acid/polycarboxylic acid. In another approach (Scheme 2), EPO is first reacted with a small amount of a C=C containing compound such as acrylic acid. The modified-EPO is then polymerized with dicarboxylic acid/polycarboxylic acid to give the target polyester.

In contrast, the PSAs prepared with the methods described in the Background section are based on polyacrylates that have carbon-carbon backbone generated via chain-growth polymerization of the carbon-carbon double bonds of acrylate monomers (see Scheme 3 below). The C=C bonds are introduced into vegetable oils or fatty acid methyl esters to give acrylate monomers that can free-radically polymerize to give PSA polymers. These acrylate monomers are not yet polymers and thus have a much lower molecular weight than the presently disclosed polyesters.

Scheme 1

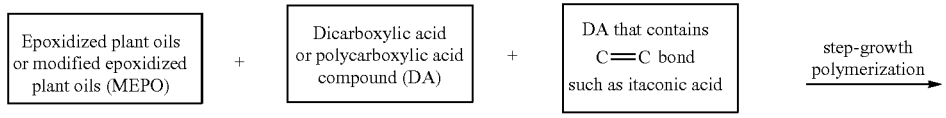

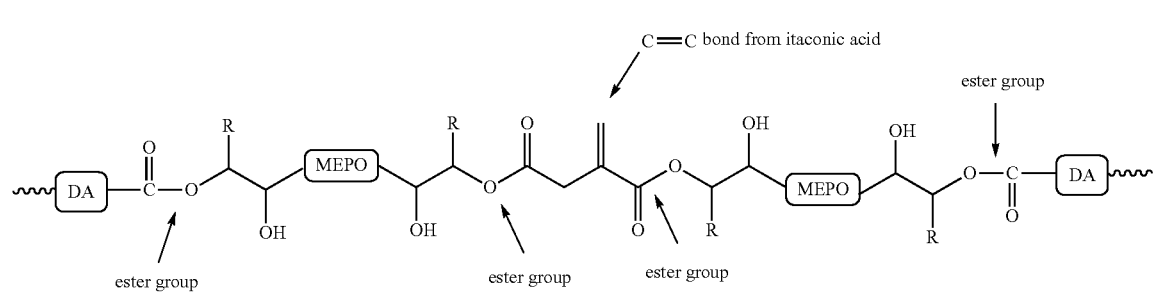

Polyesters containing a small amount of C=C ( ∿∿∿ represents the remaining polymer chains)

UV curing

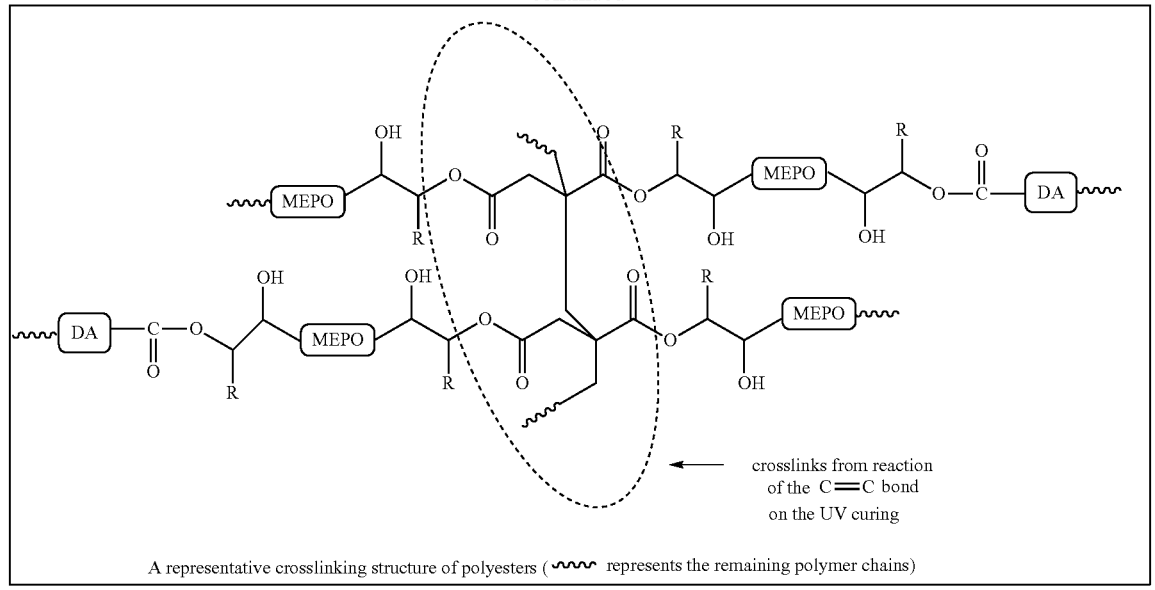

A representative crosslinking structure of polyesters (⌇ represents the remaining polymer chains)

In the polymer structure shown in Scheme 1, each R is independently an alkyl (e.g., $C_1$-$C_{24}$) that is derived from a part of the fatty acid chains from epoxidized plant oil; and each ⌇ represents independently parts/segments of the polyester chains.

Scheme 2

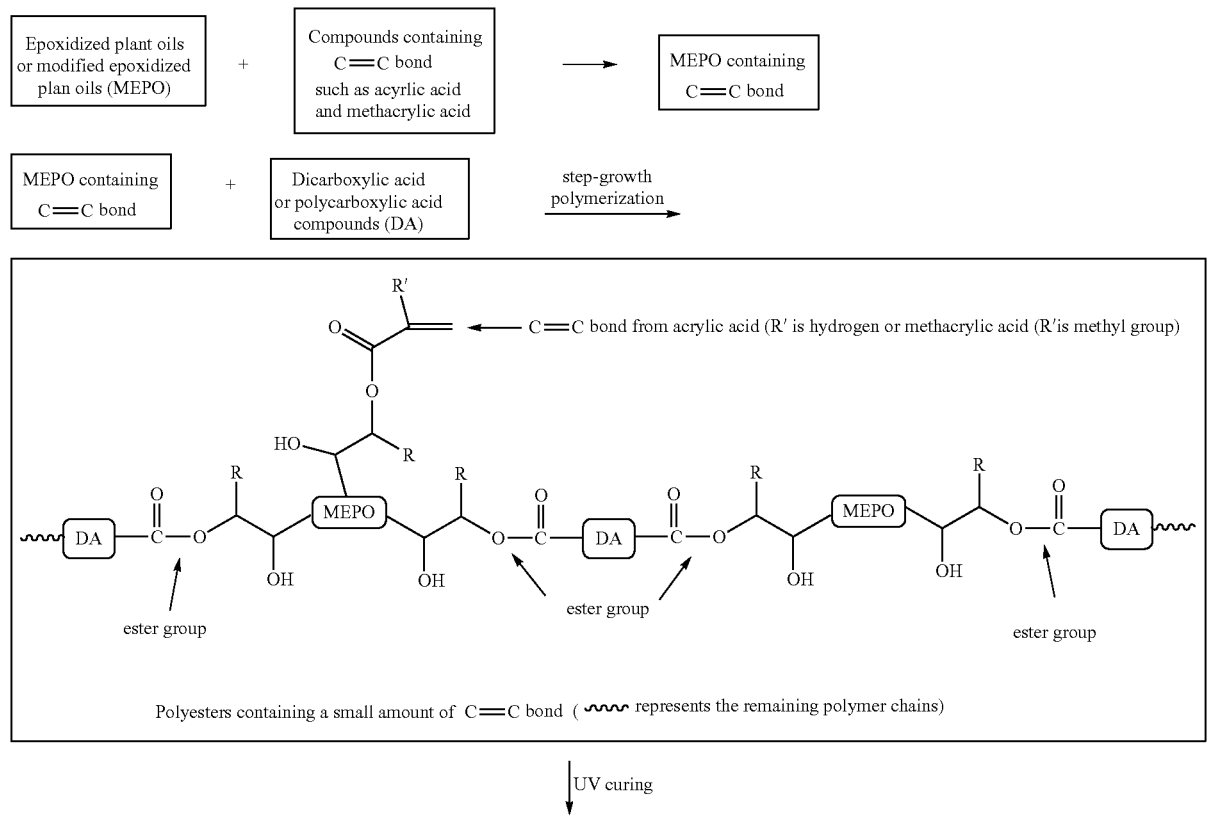

Polyesters containing a small amount of C=C bond (⌇ represents the remaining polymer chains)

↓ UV curing

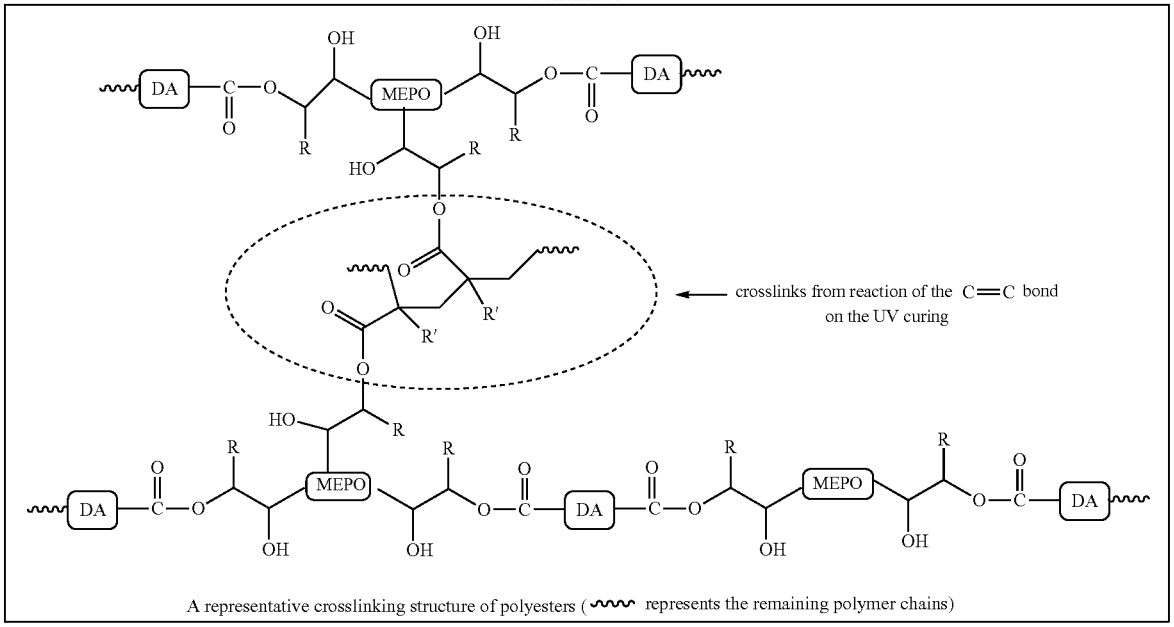

A representative crosslinking structure of polyesters (⌇⌇⌇ represents the remaining polymer chains)

In the polymer structure shown in Scheme 2, each R' is independently H or methyl group; R is independently an alkyl (e.g., $C_1$-$C_{24}$) that are derived from a part of the fatty acid chains from epoxidized plant oil; and each ⌇⌇⌇ represents independently parts/segments of the polyester chains.

Scheme 3

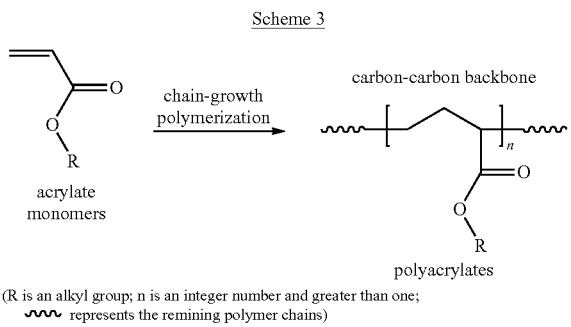

(R is an alkyl group; n is an integer number and greater than one; ⌇⌇⌇ represents the remining polymer chains)

The UV-cured PSAs disclosed herein offer a cost-effective and high productivity alternative to the thermally-cured PSAs. Novel UV-curable resins are prepared from renewable plant oils or animal fats, which can be readily coated onto face stocks or liners at a high coating speed. The coatings from the resins can be rapidly cured via UV radiation to afford PSAs with sufficient cohesive strength.

In some embodiments, the polyesters containing pendant C=C bonds are prepared from polymerization of monocarboxylic acid-modified epoxidized soybean oil (MESO) (or other plant oil or animal fat) with (a) at least one dicarboxylic acid or polycarboxylic acid and (b) a small amount of at least one compound that contains one C=C bond and at least two —COOH groups. The compound (b) introduces pendant C=C bonds into the polyester. Illustrative compounds for compound (b) include, but are not limited to, itaconic acid, fumaric acid and maleic acid. Anhydrides of these compounds can be also used instead of their free acid that include, but are not limited to, itaconic anhydride and maleic anhydride. Bio-based itaconic acid is preferred. The C=C containing compounds (b) can be used in an amount of 0.01 mole to 0.10 mole per 100 grams of the total mass of reaction mixtures, preferably, 0.02 mole to 0.07 moles per 100 grams of the total mass. The polymerization can be performed in the presence of a catalyst at a temperature suitably in the range from 30° C. to 180° C. for 30 min to 720 min, preferably from 100° C. to 150° C. for 90 min to 420 min. The catalyst can be any compound that catalyzes the reaction between —COOH and epoxy group. Preferably, magnesium-containing catalysts such as magnesium acetate hydrate, magnesium acetate anhydride and magnesium hydroxide are used.

In other embodiments, the polyesters containing pendant C=C bonds are prepared with the following route. Epoxidized soybean oil (ESO) (or other plant oil or animal fat) is first reacted with (a) a small amount of at least one compound that contains one C=C bond and one —COOH group, and optionally (b) at least one monocarboxylic acid, to give a modified-ESO containing a C=C bond. The compound (a) introduces pendant C=C bonds into the polyester. Illustrative compounds for compound (a) include, but are not limited to, acrylic acid and methacrylic acid. Anhydrides of these compounds can be also used instead of their free acid, which include, but are not limited to, acrylic anhydride and methacrylic anhydride. The reaction can be performed in the presence of a catalyst at a temperature suitably in the range from 30° C. to 180° C. for 30 min to 450 min, preferably from 100° C. to 150° C. for 60 min to 240 min. The catalyst can be any compound that catalyzes the reaction between —COOH and epoxy groups. Preferably, magnesium-containing catalysts such as magnesium acetate hydrate, magnesium acetate anhydride and magnesium hydroxide are used. The resulting modified-ESO is then polymerized with at least one dicarboxylic acid or polycarboxylic acid to give polyesters with pendant C=C bonds along the polymer chains. The polymerization can be performed at a temperature suitably in the range from 30° C. to 180° C. for 60 min to 720 min, preferably from 100° C.

to 150° C. for 90 min to 420 min. The C=C containing compound (a) can be used in an amount of 0.01 mole to 0.10 mole per 100 grams of the total mass of final resins, preferably, 0.02 mole to 0.07 mole per 100 grams of the total mass.

In certain embodiments, at least one monocarboxylic acid is added to the reaction mixture during polymerizations for preparing the polyesters with pendant C=C bonds. The monocarboxylic acid can be added at the beginning or in the middle stage of the polymerizations. The addition of the monocarboxylic acid can adjust the polymerizations in terms of lowering the molecular weight of the resulting polymers and limiting formation of cross-linked polymer networks. The monocarboxylic acid used herein can be any compound described herein, but acetic acid is preferred because it is inexpensive and has a low boiling point. In some embodiments, acetic acid is used as the monocarboxylic acid, and is used in excess in the reaction mixture to thoroughly consume the epoxy groups of the reaction mixture. The resulting polymers are stable since no more epoxy groups are present and thus no more reactions involving epoxy groups will occur. After the reactions are complete, the excess acetic acid can be distilled and reused. Alternatively, the acetic acid can be left in the reaction mixtures as a solvent for the polymers, thus decreasing the viscosity of the mixtures and facilitating the subsequent coating process. The mixtures can be coated continuously with a typical coating machine at a line speed of from 3 meter/min to 50 meters/min, preferably from 6 meters/min to 30 meters/min.

Epoxidized Plants Oils or Epoxidized Animal Fats

The epoxidized plant oils (EPO) or epoxidized animal fats are generally any derivative of plant oils or animal fats whose double bonds are fully or partly epoxidized using any known epoxidation method such as the in-situ performic acid process that is the widely used in industry. The plant oil used to make epoxidized plant oils can be soybean oil, canola oil, palm oil, olive oil, corn oil, cottonseed oil, linseed oil, rapeseed oil, castor oil, coconut oil, palm kernel oil, rice bran oil, safflower oil, sesame oil, sunflower oil, or other polyunsaturated plant oils, or mixtures thereof. Animal fats that can be used herein include but not limited to, (1) unsaturated oils of marine origin, such as menhaden, sardine, and herring oil; (2) animal fats like tallow, butterfat, and lard. In addition, monoglycerides and diglycerides of unsaturated fatty acids derived from plant oils or animal fats can be also used herein for the preparation of the epoxidized plants oils or epoxidized animal fats. Soybean oil is one of the least expensive plant oils and its epoxidized product, epoxidized soybean oil (ESO) is commercially available, e.g., from supplier CHS Inc. (Inver Grove Heights, Minn.). ESO is preferably used in the compositions and methods disclosed herein. In certain embodiments, more than one epoxidized plant oil and/or epoxidized animal fat can be utilized in a single reaction mixture if desired.

The epoxidized plant oils may contain about 1.5 to about 6 epoxy groups (or even more) per triglyceride. It is preferred that the EPO contain functionality (epoxy number) of 2 to 5, more preferably 2.5 to 4.5. The epoxy functionality of EPO can be controlled by epoxidizing less than all of the double bonds of the starting plant oils.

Certain epoxidized plant oils have a functionality of epoxy groups above two, which can result in cross-linked polymers when polymerized with dicarboxylic acids or polycarboxylic acids; the cross-linked polymers are not thermoplastic and thus cannot be coated. Therefore, in some embodiments, the EPOs with high epoxy functionality are modified by reacting with at least one monocarboxylic acid or its anhydride derivative ("modifier") to lower their epoxy functionality. The epoxy functionality of the monocarboxylic acid-modified epoxidized plant oils (MEPO) can be adjusted by changing the amount of monocarboxylic acid used in the modification reaction. The epoxy functionality of MEPO along with other polymerization parameters determines the molecular weight and cross-linking (if any) density of the PSAs formed from polymerizations of MEPO with dicarboxylic acids/polycarboxylic acids. In other words, the molecular weight and cross-linking density of the PSAs can be fine-tuned by changing the epoxy functionality of MEPO to meet various demands of PSA applications. For example, for removable or ultra-removable PSA applications, the cross-linking density of the PSA polymers can be designed and adjusted to be higher than that for permanent applications.

The monocarboxylic acids that can be used for the preparation of MEPO include, but are not limited to, formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachildic acid, heneicosylic acid, behenic acid, tricosylic acid, and lignoceric acid, naphthalene acid, oleic acid, linoleic acid, myristoleic acid, palmitoleic acid, sapienic acid, elaidic acid, vaccenic acid, linoelaidic acid, linolenic acid, arachidonic acid, eicosapentaenoic acid, erucic acid, docosahexanenoic acid, abietic acid or tall oil rosin that contains abietic acid, benzoic acid, phenylacetic acid, 1-naphthaleneacetic acid, 2-naphthaleneacetic acid, 1-naphthoic acid, 2-naphthoic acid, 2-furoic acid, 3-methylpyridine-2-carboxylic acid, 1-methylpyrrole-2-carboxylic acid, pyrimidine-2-carboxylic acid, and mixtures thereof. Anhydrides of the above monocarboxylic acids can be also used for the preparation of MEPO. In some embodiments, monocarboxylic acids containing aromatic structure such as benzoic acid, or monocarboxylic acids containing heterocyclic ring structure such as 2-furoic acid are preferred. In addition to lowering the epoxy functionality of EPOs, the use of these special monocarboxylic acids can also result in MEPOs containing aromatic or heterocyclic ring structure, which is beneficial for increasing the cohesion strength of the PSAs.

The reaction between EPOs and the monocarboxylic acids takes place readily in the presence of a catalyst. Catalysts used to catalyze the reaction between epoxy and —COOH groups can be used herein, which include but not limited to (1) amines such as triethylamine, dimethylbenzylamine, 2-methylpyridine, 1-methyl imidazole and 1,8-diazabicyclo [5.4.0]undec-7-ene; (2) metal salts or complexes such as chromium (III) tris(acetylacetonate), chromium (III) 2-ethylhexanoate, AFC Accelerator AMC-2 (a solution of chromium (III) complex purchased from Ampac Fine Chemical LLC (Rancho Cordova, CA)), zinc acetylacetonate, zinc octoate, stannous octoate, titanium acetylacetonate, zirconium octoate, nickel acetylacetonate, manganese naphthenate, iron octoate, iron acetylacetonate, cobalt octoate, cobalt acetylacetonate, aluminum acetylacetonate, dibutyltin dilaurate, dibutyltin oxide, cerium naphthenate, calcium octoate, bismuth octoate, lithium acetate, sodium acetate, and potassium acetate; (3) quaternary ammonium compounds such as tetra(n-butyl) ammonium bromide, tetramethyl ammonium chloride and benzyltriethyl ammonium chloride; (4) quaternary phosphonium compounds such as tetra(n-butyl) phosphonium bromide, ethyltriphenyl phosphonium iodide, tetraphenyl phosphonium bromide, and n-butyltriphenyl phosphonium chloride; (5) phosphines such as triphenylphosphine; (6) alkali metal hydroxide such as potassium hydroxide and sodium hydroxide.

It has been discovered herein that magnesium-containing compounds that include, but are not limited to, magnesium acetate hydrate, magnesium acetate anhydrous, magnesium stearate, magnesium hydroxide, magnesium chloride hydrate and magnesium chloride anhydrous can effectively and efficiently catalyze the reaction of —COOH with the epoxy groups of EPOs. These magnesium-containing catalysts are abundantly available, inexpensive, non-volatile and non-toxic, and thus are preferably used herein.

The catalyst can be used in an amount of 0.05 wt % to 5 wt % based on total mass of reaction mixture, preferably 0.1 wt % to 1.0 wt % based on the total mass. In the presence of a catalyst, the reaction between EPO and the monocarboxylic acids can be complete in a typical time of 30 min to 420 min at a temperature ranged from 30° C. to 300° C., more typically, in a time of 60 min to 240 min at a temperature ranged from 100° C. to 180° C.

Dicarboxylic Acids or Polycarboxylic Acids

Dicarboxylic acids or polycarboxylic acids used preparing the PSAs can be any organic compounds that contain at least two —COOH groups, which include, but are not limited to, malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or mixtures thereof. Dimer acid is a dimer of an unsaturated fatty acid, and trimer acid is a timer of an unsaturated fatty acid. The preparation and separation of dimer acid and trimer acid are well-known in the art, see, e.g., U.S. Pat. No. 3,287,273. Typically, unsaturated fatty acid or mixtures of unsaturated fatty acids (e.g., tall oil fatty acids that consist mainly of oleic acid and linoleic acid) are heated at elevated temperatures on clay catalysts (e.g., montmorillonite clay) to give a mixture of dimer acid and trimer acid as well as a small amount of polymeric fatty acid and unreacted fatty acids. Separation of the reaction mixture affords pure dimer acid or products that are rich in dimer acid or trimer acid. The products can be further hydrogenated to give saturated forms of dimer acid or trimer acid.

In certain embodiments, the dimer acid is a dimer of an unsaturated fatty acid or a mixture of the dimer and a small amount (up to 10 weight percent) of a monomer or trimer of the unsaturated fatty acid. The trimer acid is a timer of an unsaturated fatty acid or a mixture of the trimer and a small amount (up to 10 weight percent) of a monomer or dimer of the unsaturated fatty acid. The dimer acid or trimer acid acid may be a mixture of dimerized, trimerized or polymerized unsaturated fatty acids. Preferable unsaturated fatty acids include carboxylic acids having 12 to 24 carbon atoms and at least one unsaturated bond per molecule. Preferable acids having one unsaturated bond include, for example, oleic acid, elaidic acid and cetoleic acid. Preferable fatty acids having two unsaturated bonds include sorbic acid and linoleic acid. Preferable fatty acid having three or more of unsaturated bonds include linoleinic acid and arachidonic acid. The dimer acid or trimer acid may be partially or fully hydrogenated. Illustrative dimer acids have the structure:

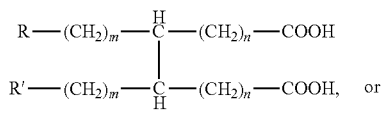

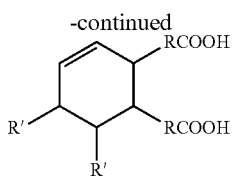

where R and R' are the same or different, saturated, unsaturated or polyunsaturated, straight or branched alkyl groups having from 1 independently to 30 carbon atoms, and n, m, n' and m' are the same or different, ranging from 0 to 20. There may be more than one C—C crosslink between the monofunctional carboxylic acid moieties. Alternatively, R and R' are the same or different, saturated, unsaturated or polyunsaturated, straight alkyl groups having from 1 independently to 20 carbon atoms, or having from 1 independently to 8 carbon atoms; n and m are the same or different, ranging from 1 independently to 10, or ranging from 4 independently to 16. In other non-limiting embodiments R may be butyl and R' may be octyl; n may be 8 and m may be 14.

In another embodiment, the dimer acid may have the definition found in U.S. Pat. No. 3,287,273, incorporated herein in its entirety by reference. Such commercial dimer acids are generally produced by the polymerization of unsaturated $C_{18}$ fatty acids to form $C_{36}$ dibasic dimer acids. Depending on the raw materials used in the process, the $C_{18}$ monomeric acid may be linoleic acid or oleic acid or mixtures thereof. The resulting dimer acids may therefore be the dimers of linoleic acid, oleic acid or a mixture thereof.

Illustrative dimer acids include:

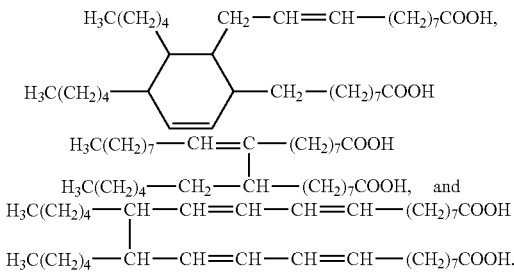

Dimer acid, trimer acid and their saturated forms are commercially available under the brand names of, e.g., UNIDYME (distributed by Arizona Chemical, LLC (Jacksonville, FL)) and PRIPOL (distributed by Croda International Plc (Snaith, UK)). UNIDYME 18 contains about 80 wt % of dimer acid and about 17 wt % of trimer acid and polymeric fatty acid. UNIDYME 14 contains about 95 wt % of dimer acid and about 5 wt % of trimer acid and polymeric fatty acid. UNIDYME 60 contains about 60 wt % of trimer acid and 40 wt % of dimer acid. UNIDYME M15 contains about 77 wt % of dimer acid, 15 wt % of trimer acid fatty acid and 8 wt % of unreacted fatty acids. PRIPOL 1009 contains about 99 wt % of hydrogenated dimer acid. PRIPOL 1025 contains about 80 wt % of hydrogenated dimer acid and 20 wt % of hydrogenated trimer acid.

In some embodiments, the dicarboxylic acids or polycarboxylic acids used are polymers/oligomers that are capped with —COOH groups at the chain ends of the polymers/oligomers. The COOH-capped polymers/oligomers can be prepared from polymerization of at least one dicarboxylic acid or polycarboxylic acid with at least one diamine/ polyamine under a reaction condition that the molar ratio of —COOH groups to the amine groups of the diamine/polyamine is greater than 1.0, preferably greater than 1.2. The polymerization proceeds via the reaction between —COOH and amine groups; when all of the amino groups are consumed, polyamides that are capped with —COOH groups at chain ends are obtained. By selecting the reactants and adjusting the —COOH/amine molar ratio, a rich array of thermoplastic polymers/oligomers capped with —COOH groups at chain ends can be obtained. Illustrative diamines/polyamines that can be used herein include but not limited to, ethylenediamine, 1,6-hexanediamine, 1,3-propylenediamine, 1,2-propylenediamine, 1,4-butanediamine, 1,5-pentanediamine, diphenylethylenediamine, diaminocyclohexane, o-xylylenediamine, m-xylylenediamine, p-xylylenediamine, o-phenylenediamine, m-phenylenediamine, p-phenylenediamine, 2,5-diaminotoluene, dimethyl-4-phenylenediamine, N,N'-di-2-butyl-1,4-phenylenediamine, 4,4'-diaminobiphenyl, 1,8-diaminonaphthalene, and diamines or polyamines that are sold under brand name JEFFAMINE (distributed by Huntsman Corp. (Woodlands, TX)). The polymerization of the dicarboxylic acid or polycarboxylic acid with the diamine/polyamine can be performed at a temperature suitably in the range from 100° C. to 300° C. for 30 min to 420 min, preferably from 130° C. to 200° C. for 60 min to 240 min. Preferably, vacuum or nitrogen purging is applied to the reaction mixture at the later stage of the reaction to remove the by-product, water.

COOH-capped polymers/oligomers can also be prepared from polymerization of at least one dicarboxylic acid or polycarboxylic acid with at least one epoxy compound that has at least two epoxy functional groups under reaction condition that the molar ratio of —COOH groups to the epoxy groups of the epoxy compound is greater than 1.0, preferably greater than 1.2. The polymerization proceeds via the reaction between —COOH and epoxy groups; when all of the epoxy groups are consumed, polyesters that are capped with —COOH groups at chain ends are obtained. Epoxy compounds that can be used herein include but not limited to bisphenol A diglycidyl ether, bisphenol A ethoxylate diglycidyl ether, bisphenol A propoxylate diglycidyl ether, bisphenol F diglycidyl ether, bisphenol F ethoxylate diglycidyl ether, bisphenol F propoxylate diglycidyl ether, ethylene glycol diglycidyl ether, diethylene glycol diglycidyl ether, poly(ethylene glycol) diglycidyl ether, propylene glycol diglycidyl ether, dipropylene glycol diglycidyl ether, poly(propylene glycol) diglycidyl ether, 1,3-butanediol diglycidyl ether, 1,4-butanediol diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, dimer acid diglycidyl ester, 1,4-cyclohexanedimethanol diglycidyl ether, resorcinol diglycidyl ether, poly(dimethylsiloxane) terminated with diglycidyl ether, trimethylolpropane triglycidyl ether, trimethylolethane triglycidyl ether, N,N-diglycidyl-4-glycidyloxyaniline, 4,4'-methylene tris(4-hydroxyphenyl)methane triglycidyl ether, tris(2,3-epoxypropyl) cyanurate, tris(2,3-epoxypropyl) isocyanurate, epoxidized polybutadiene, epoxidized fatty acid esters, epoxidized plant oils, epoxidized animal oil/fats, and mixtures thereof.

Furthermore, COOH-capped polymers/oligomers can also be prepared from polymerization of at least one dicarboxylic acid or polycarboxylic acid with at least one diol/polyol under reaction conditions wherein the molar ratio of —COOH groups to the hydroxyl groups of the diol/polyol is greater than 1.0, preferably greater than 1.2. The polymerization proceeds via the reaction between —COOH and hydroxyl groups; when all of the hydroxyl groups are consumed, polyesters that are capped with —COOH groups at chain ends are obtained. The diols/polyols that can be used herein include, but are not limited to, ethylene glycol, 1,2-propanediol, 1,2-butanediol, 1,3-butanediol, 2,3-butanediol, 1,4-butanediol, 1,2-pentanediol, 1,5-pentanediol, 1,8-octanediol, etohexadiol, p-menthane-3,8-diol, 2-methyl-2,4-pentanediol, glycerin, trimethylolpropane, pentaerythritol, maltitol, sorbitol, xylitol, isomalt, or mixtures thereof.

PSAs from the Polyesters Containing C=C Bonds Along Polymer Chains

One method of making PSAs disclosed herein is described as follows. Polyesters containing free-radically polymerizable pendant C=C bonds are firstly prepared as described herein. These polyesters are then blended with at least one photoinitiator to give resins that are stable in the absence of a UV source. It has been discovered that the resin can be readily coated and rapidly cured under a UV source to afford PSAs. Photoinitiators that can be used for curing include, but are not limited to benzophenone, 2,2-dimethoxy-2-phenylacetophenone, diphenyl(2,4,6-trimethylbenzoyl)phosphine oxide, 2-hydroxy-2-methylpropiophenone, acetophenone, p-anisoin, anthraquinone, benzil, benzoin, benzoin ethyl ether, benzoin isobutyl ether, benzoin methyl ether, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 2,2-diethoxyacetophenone, 4,4'-dihydroxybenzophenone, 4-(dimethylamino)benzophenone, 4,4'-dimethylbenzil, 2,5-dimethylbenzophenone, 3,4-dimethylbenzophenone, 4'-ethoxyacetophenone, 2-ethylanthraquinone, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, thioxanthen-9-one, 3,3',4,4'-benzophenonetetracarboxylic dianhydride, ferrocene, or mixtures thereof. Typically, a UV energy dosage of 0.05-2.0 J/cm$^2$, more typically, 0.1-1.0 J/cm$^2$, is enough for curing the resins to give PSAs with sufficient cohesive strength.

In certain embodiments, a small amount of less than 0.1 mole of C=C bond per 100 grams of polyesters is enough for the subsequent curing for PSAs with sufficient cohesive strength. The amount of C=C bonds can be from 0.01 mole to 0.10 mole of C=C bonds per 100 grams of polyesters, preferably, from 0.02 mole to 0.07 mole of C=C bonds per 100 grams of polyesters. However, for the PSAs described in the Background section of the present application, the C=C bond is introduced to epoxidized fatty acid esters for acrylated fatty acid esters (AFAE). For an effective polymerization, one AFAE must contain at least one C=C bond; specifically, there is about 0.3 mole of C=C bond per 100 grams of AFAE considering that a typical AFAE has a molecular weight of about 300.

In certain embodiments, no solvents are used in preparing the polyesters or in the subsequent coating process. However, for the PSAs described in the Background section of the present application, organic solvents are required for the polymerizations of the acrylated fatty acid esters (AFAE), or water is required for the emulsion polymerizations of AFAE. After the resulting solutions or emulsions are coated, the solvents or water must be removed. The removal of solvents or water is energy-consuming, which is not desirable for ecological and economic reasons.

PSAs from the Polyesters Containing C=C Bonds and Compounds Containing Thiol Groups As described previously, the polyesters that contain pendant C=C bonds can be readily cured in the presence of a photoinitiator under a UV source to give PSAs. It has been discovered that these polyesters can be also UV-cured in the presence of at least one compound containing at least two functional groups that can react with the C=C bonds. Photoinitiators that can be used herein include, but are not limited to benzophenone and 2,2-dimethoxy-2-phenylacetophenone (see examples previously described herein). The new functional group can be thiol group (—SH), and the compounds containing —SH include, but are not limited to, trimethylolpropane tris(3-mercaptopropionate), pentaerythritol tetrakis(3-mercaptopropionate), 1,2-bis(2-mercaptoethoxy)ethane, tetra(ethylene glycol) dithiol, poly(ethylene glycol) dithiol, 1,6-hexanedithiol, 4,4'-thiobisbenozenethiol, and mixtures thereof. The SH-containing compounds can also be products from renewable plant oils, e.g., POLYMERCAPTAN® 358 and 407 from Chevron Phillips Chemical (the Woodlands, TX). POLYMERCAPTAN 358 is a mercaptanized soybean oil from reaction of soybean oil with hydrogen disulfide, and POLYMERCAPTAN 407 is a mercapto hydroxy soybean oil from reaction of epoxidized soybean oil with hydrogen disulfide. POLYMERCAPTAN 358 and POLYMERCAPTAN 407 are bio-based and thus preferably are used for this embodiment of the PSAs. The SH-containing compound can be added in an amount so that the molar ratio of the —SH group to the C=C bond of the polyester (—SH/C=C ratio) ranges from 0 to 1.0.

In the absence of a SH-containing compound, the polyesters containing C=C bonds can form cross-linked polymer networks (type-I networks) via addition polymerization of the C=C bonds. When a SH-containing compound is present in the reaction mixture, these polyesters can also react with the SH-containing compound via addition reaction between C=C and —SH groups to give cross-linked polymer networks (type-II networks). The type-II networks are much different from the type-I networks in terms of the chemical structure and cross-linking density, thus resulting in different PSA properties (i.e., adhesive strength, tack and cohesive strength) from the latter. In other words, the PSA properties can be adjusted by changing the usage amount of the SH-containing compound and thus the amount of the formed type-II networks in the PSAs.

PSAs from the Polyesters that do not Contain C=C Bonds Along Polymer Chains

Still another method of making PSAs disclosed in this invention is based on a concept of semi-interpenetrating polymer network (SIPN), which is a novel system for PSAs. SIPN is a polymer blend comprising at least one cross-linked polymer network (component I) and at least one non-crosslinked polymers (component II) characterized by the penetration of the component II into component I on a molecular scale.

Specifically, the component II is a polyester prepared from polymerization of at least one monocarboxylic acid modified-epoxidized plant oil (MEPO) with at least one dicarboxylic acid or polycarboxylic acid. The polyester is then blended with (a) at least one compound containing at least two acrylate or methacrylate groups and (b) a photoinitiator to give a resin mixture. The compound (a) can be used in an amount of 0.005 mole to 0.1 mole per 100 grams of the total mass of resin, preferably, 0.01 mole to 0.07 mole per 100 grams of the total mass. The compound (a) can include but not limited to bisphenol A diacrylate, bisphenol A dimethacrylate, bisphenol A ethoxylate diacrylate, bisphenol A ethoxylate dimethacrylate, trimethylolpropane triacrylate, triethylene glycol diacrylate, triethylene glycol diacrylate, 1,4-phenylene dimethacrylate, poly(propylene glycol) diacrylate, poly(propylene glycol) dimethacrylate, di(ethylene glycol) diacrylate, 1,6-hexanediol diacrylate, 1,4-butanediol diacrylate, and 1,3-butanediol diacrylate, or mixtures thereof. The compounds (a) can also be products from reaction of renewable epoxidized plant oils or epoxidized animal fats with acrylic acid or methacrylic acid. Acrylated epoxidized soybean oil (AESO) is commercially available; e.g., AESO with a brand name PHOTOMER 3005 are sold from supplier IGM resins B.V. (Waalwijk, the Netherlands). AESO is bio-based and are preferably used for certain embodiments of the PSAs disclosed herein.

The resin mixture is stable in the absence of a UV source, but can be readily coated and rapidly cured under a UV source. In the UV curing process, radicals are generated from the photoinitiator under the UV radiation, which then initiate polymerization of the acrylate or methacrylate containing compound (a) to give a cross-linked polymer network. The cross-linked network acts as the component I of a SIPN, with the component II of the SIPN being the polyester prepared previously. Typically, a UV energy dosage of 0.05-2.0 $J/cm^2$, more typically 0.1-1.0 $J/cm^2$, is enough for curing the resin to give a PSA with sufficient cohesive strength. The cross-linked polymer network provides the cured PSA with cohesive strength. In addition, the polymer network such as that from AESO contains ester and hydroxyl groups (—OH), and the polyester contains ester, —OH and —COOH groups; hydrogen bonds such as ester-OH bond and COOH—OH bond can thus form among the network and/or polyester. The hydrogen bonds can act as extra cross-links and further increase the cohesive strength of the cured-PSA.

In some embodiments, pendant aromatic or heterocyclic ring structure is introduced along the chains of the polyesters (component II of the SIPN). Briefly, monocarboxylic acid-modified ESO (MESO) containing aromatic or heterocyclic ring structure (the preparation of MESO is described previously) is polymerized with at least one dicarboxylic acid or polycarboxylic acid to give a polyester with pendant aromatic or heterocyclic ring structure along the polymer chains. The polymerization can be performed in the presence of a catalyst at temperatures ranged from 30° C. to 300° C. for 45 min to 600 min, preferably from 100° C. to 200° C. for 90 min to 420 min. The catalyst can be any compound that catalyzes the reaction between —COOH and epoxy group (see examples described previously in this disclosure). Preferably, magnesium-containing catalysts such as magnesium acetate hydrate, magnesium acetate anhydride and magnesium hydroxide are used. It is discovered that PSAs containing such polyesters have better cohesive strength than those without pendant aromatic or heterocyclic ring structure. Although not bound by any theory, it is believed that the aromatic or heterocyclic ring structure can potentially pack together through π-electron stacking to form extra physical cross-links among the polyesters, which can further increase the cohesive strength of the PSAs.

In other embodiments, amide groups are introduced along the chains of the polyesters. Briefly, polyamide-based dicarboxylic acids or polycarboxylic acids that are capped with —COOH groups at chain ends (the preparation is described previously) are polymerized with MESO to give polyesters containing amide groups. The polymerization can be performed in the range from 30° C. to 300° C. for 60 min to 600 min, preferably from 100° C. to 200° C. for 90 min to 450 min. The resulting polymers are solid at room temperature, but readily melt on heating. It is discovered that PSAs containing such polyesters have stronger adhesive strength and cohesive strength than those without amide groups. Although not bound by any theory, it is believed that the polyesters contain amide, ester, and —OH groups along the polymer chains; hydrogen bonds can form efficiently among the amide groups (amide-amide bond) or between the amide groups and the —OH or ester groups (amide-hydroxyl bond and amide-ester bond, respectively), which could result in "cross-links" among the polyesters. The strong interactions among the polyesters might be related to the strong adhesive strength of the PSAs containing amide groups. In addition, the cross-linked polymer networks such as that from AESO contains ester and —OH groups; cross-links can also be formed between the polyesters and the polymer networks via possible hydrogen bonds such as amide-OH bond and amide-ester bond. The extra "cross-links" among the polyesters and those between the polyesters and crosslinked polymer networks can significantly increase the cohesive strength of the PSAs.

In some embodiments, the SPIN-based PSAs use a small amount of acrylated epoxidized vegetable oils (AEVOs) in addition to the main component polyesters. It should be noted that the polyesters do not need to contain polymerizable C=C bonds, which is one of the novel and unique characteristics of the SPIN-based PSAs.

The PSA compositions can also include fillers and other additives that can be tackifiers, colored pigments, opacifiers, processing oils, plasticizers, solvents and other ingredients typically used for PSAs. The fillers and additives can be used in amounts of 1 wt % to 60 wt % based on the total mass of the PSA compositions, preferably 10 wt % to 40 wt % based on the total mass of the PSA compositions. Preferably, bio-based tackifiers are used, which are prepared by reacting epoxidized plant oil with tall oil rosin that mainly consists of abietic acid.

The crosslinked polymers of the compositions generally possess glass transition temperatures $T_g$ at or below room temperature and have appropriate density of chemical and/or physical crosslinks, which render the polymers a balance between sufficient cohesive strength ("dry") and good initial tack and adhesive power. For example, the $T_g$ of the PSA compositions may be from 0 to −60° C., preferably from −20 to −60° C., more preferably from −30 to −60° C.

In certain embodiments, the pressure sensitive adhesive composition is biodegradable. For example, the composition will decompose when placed in a landfill or similar environment because of the degradable ester linkages present in the polymer structure.

In certain embodiments, the polymer product disclosed herein is the majority component of the pressure sensitive adhesive composition meaning the pressure sensitive adhesive composition includes at least about 50, particularly at least about 70, more particularly at least about 80, and most particularly at least about 90, weight percent of the polymer product based on the total weight of the pressure sensitive adhesive composition.

The components of the composition may be admixed in any combination, in any order.

In certain embodiments, all the components of the pressure sensitive adhesive composition are blended into a single composition that is stable in the absence of a UV source. The composition is convenient to use; it can be readily coated and cured with UV to provide a pressure sensitive adhesive.

In certain embodiments, one or more of the ingredients of the mixture are dissolved in a solvent or otherwise carried in a fluid medium (for example, as an emulsion or dispersion).

If a solvent or other fluid medium is used with one or more ingredients, the solvents or other fluid media of the plural ingredients may be chosen independently of each other. In some embodiments, the mixture is substantially free of solvent. As defined herein, a material is "substantially free of solvent" if that material contains at least 75% "solids" by weight based on the total weight of that material. By "solids" is meant herein all materials that have a boiling point above 150° C. at 760 mmHg.

In some embodiments, the mixture is at least 80% solids, or at least 90% solids, or at least 95% solids, or at least 98% solids, by weight based on the total weight of the mixture.

Also contemplated are "low solids" embodiments, which are embodiments in which the mixture contains less than 75% solids by weight based on the weight of the mixture. In some low solids embodiments, the solids may be dissolved in a fluid medium or dispersed in a fluid medium or a combination thereof.

The mixture is formed by admixing the ingredients; the admixing may be performed by any means. In some embodiments, the ingredients are all liquids, and they may be admixed simply by placing the ingredients in a container and stirring. If any ingredient is a solid, it is contemplated that sufficient agitation will be provided to dissolve or suspend the solid in the mixture.

The mixture, when it is freshly mixed, should have a useful viscosity at 23° C. In some embodiments, the freshly-mixed functional mixture will be a liquid with viscosity of 1 cps or higher. In some embodiments the freshly-mixed mixture will be a liquid with viscosity of 500,000 cps or less.

In certain embodiments, the mixture is capable of curing at 10° C. to 50° C. in 20 days or less.

In certain embodiments, the pot life of the admixture that includes all the ingredient is 10 days or less at 10° C. to 50° C. The pot life is the time from the formation of the admixture until the viscosity of the mixture rises until it is so high that the admixture can no longer be applied to a substrate at 10° C. to 50° C.

According to particular embodiments, the disclosed PSAs may be used to manufacture many different types of PSA constructs or articles. Thus, various flexible backings and liners may be used, including films (transparent and non-transparent), plastics such as PET film, BOPP and PVC film or modified natural substances such as cellophane, cloths, papers, non-woven fibrous constructions, metal foils, metalized plastics foils, aligned filaments, etc. The adhesive layers can be covered with paper or films which contain an adhesive-repellent layer, e.g. a separating layer consisting of silicone, for the protection of the adhesive layers on the PSA backings. The back side of the PSA films, tapes or foils can be coated with an adhesive-repellent coating (e.g., silicone coating) for facilitating rolling off the PSA.

In some embodiments, substrates included in the adhesive articles include a thermoplastic polyurethane, a thermoplastic polyester, or a combination thereof. The thermoplastic polyurethane or thermoplastic polyester may be selected to have a high moisture vapor rate. Such substrates are useful, for example, in absorbent articles. In some embodiments, the substrate includes a thermoplastic polyurethane. A variety of thermoplastic polyurethanes may be useful, including polyether-based polyurethanes and polyester-based polyurethanes. For example, a polyether or polyester with isocyanate-reactive terminal groups may be reacted with an aryl, alkyl, arylalkylenyl, or cycloalkyl diisocyanate to provide a useful polyurethane. Exemplary suitable polyurethanes include those commercially available, for example, from Lubrizol, Wickliffe, Ohio, under the trade designation "ESTANE" (e.g., "ESTANE 58237", "ESTANE 58309", or "ESTANE 58213") and from Huntsman, The Woodlands, Tex., under the trade designation "IROGRAN" (e.g., "IROGRAN A 60 E 4902"). A variety of thermoplastic polyesters may also be useful. Exemplary suitable polyesters include those commercially available, for example, from Mitsubishi, Greer, S.C., under the trade designation "HOSTAPHAN 3SAB" polyester film and from E.I. du Pont de Nemours and Company, Wilmington, Del., under the trade designation "HYTREL".

Test Methods

Measurement of the peel strength of a PSA. Measurement of the peel strength is carried out on a stainless steel panel (type 302 with a bright annealed finish) in accordance with Test Method A of ASTM D3330/D3330M-04 (Standard Test Method for Peel Adhesion of Pressure-Sensitive Tape, reapproved 2010). Briefly, the measurement is performed with an Instron Testing Machine (model 5582, Instron, Norwood, MA) at 23±1° C. and 40±5% RH. One end of a PSA specimen tape (24 mm by 200 mm) is applied onto the stainless steel panel and then pressed with a roller with a weight of 2040 g twice in the lengthwise direction. The other free end of the tape is attached to the grip on the load cell of the testing machine. After 20 min, the tape is peeled upwards at 180° angle at a speed of 5 mm/s; the force required to peel off the tape from the test panel is recorded as peel strength. Five specimens are tested for each PSA sample and the averaged value in N/cm is reported as the peel strength. Unless otherwise noted, the failure mode is adhesive failure, i.e., the sample is clearly removed, leaving no adhesive residue on the test panel.

Measurement of the shear adhesion of a PSA. The shear adhesion is measured on a stainless steel test panel (type 302 with a bright annealed finish) in accordance with the Procedure A of ASTM D3654/D3654M-06 (Standard Test Methods for Shear Adhesion of Pressure-Sensitive Tapes). Briefly, the measurement is performed at 23±1° C. and 40±5% RH. A strip of PSA tape with 24 mm in width and 130 mm in length is applied with its one end onto the test panel with a contact area of 24 by 24 mm; the tape on the panel is then pressed with a roller with a weight of 2040 g twice in lengthwise direction. The other end of the PSA tape is fixed to a constant mass of 1000 g. The distance from the mass to the test panel is about 50 mm. After 20 min, the test panel along with the applied PSA tape and mass are hung on a stand at an angle of 2° relative to the vertical direction, allowing the mass hanging in the air. A timing system is used to record the time when the tape separated from the panel. The time from the point that the tape is hung onto the stand to the point that the tape completely separates from the test panel is used as the indication of shear adhesion. Three specimens are tested for each PSA sample and averaged value in hour is reported as the shear adhesion of the PSA sample.

Measurement of the loop tack of a PSA. The Loop Tack measurement is performed on a stainless steel panel (type 302 with a bright annealed finish) in accordance with Test Method A of ASTM D6195-03 (Reapproved 2011). Briefly, the measurement is performed with an Instron Testing Machine (model 5582, Instron, Norwood, MA) at 23±1° C. and 40±5% RH. A PSA specimen is looped and attached to the grip of the testing machine. The grip is then allowed to move downward until the loop is brought into contact to the test panel surface with a contact area of 25 mm×25 mm. Immediately after the contact, the grip and the loop are allowed to move upward at a speed of 5 mm/s until the loop is completely separated from the test panel. The maximum force (peak value) in newton (N) required to break the adhesive bond is recorded. Unless otherwise noted, the failure mode is adhesive failure, i.e., the sample is clearly removed, leaving no adhesive residues on the test panel.

Accelerated aging test at 60° C. The aging test for the PSAs is performed in accordance with the standards PSTC-2 ($12^{th}$ Edition) and ASTM D1000-93. Briefly, PSA tapes laminated with a release liner are placed in an Isotemp 625D Incubators (Thermo Fisher Scientific Inc., Waltham, MA) at 60° C. After four weeks, the tapes are taken out and conditioned at 23±1° C. and 40±5% RH for 24 h. PSA specimens are then prepared from the aged tapes and measured for their peel strength, loop tack and shear adhesion in accordance with the methods described previously. Four weeks of accelerated aging at a temperature of 60° C. is comparable to 3 years of natural aging for typical commercial PSA products.

EXAMPLES

Example 1. PSAs from ESO, UNIDYMe 18, Acetic Acid and Itaconic Acid

Acetic acid (52.6 g) and magnesium acetate hydrate (0.51 g) are placed in a reactor; the resulting mixture is stirred and heated at 40° C. for about 3 min to give a homogeneous solution. ESO (301.00 g) is then added to the reactor, and the resulting mixture is stirred and heated for 1 h at 125° C. and another 1 h at 140° C. Afterwards, itaconic acid (32.00 g) and 4-methoxyphenol (0.35 g) are added to the reaction mixture, and the resulting mixture is stirred and heated at 135° C. for 2.5 h. 4-Methoxyphenol is a typical inhibitor that is often used to trap free radicals and thus inhibit radical polymerization. The purpose of using it herein is to trap free radicals that can be possibly generated at high temperature and attack C=C bonds, and thus ensure that the C=C bonds of the desired polyester product are intact and thus present for use in the subsequent UV curing step. Subsequently, UNIDYME 18 (145.70 g) is added, and the resulting mixture is stirred and heated at 140° C. for about 5 h to give a viscous polymer. Finally, benzophenone (4.9 g) is dissolved in the polymer to give a viscous resin. The resin is stable in viscosity at 85° C. for at least one day.

The resin is then coated at 85° C. onto a clear polyester release liner at a coating thickness of about 0.025 mm with a HLCL-1000 hot-melt coater/laminator (ChemInstruments, Inc., Fairfield, Ohio). The coating is then laminated with biaxially oriented polypropylene (BOPP) film with the HLCL-1000 laminator. Afterwards, the laminate is subjected to UV exposure (UVA with peak emission at about 365 nm) with a UV crosslinker (CL-1000 UV crosslinker from UVP, Inc.) until the peak of the C=C bonds at 813 $cm^{-1}$ in the Fourier-transform infrared spectroscopy (FTIR) spectrum of the resin disappeared. The resulting laminate is measured as a PSA tape for its peel strength, shear strength and loop tack. The results on the properties of the PSA before and after aging test are summarized in Table 1.

TABLE 1

Properties of the PSAs prepared in this invention.

| Examples | Peel strength (N/cm) | Shear adhesion (h) | Loop tack (N) | After accelerating aging test Peel strength (N/cm) | After accelerating aging test Shear adhesion (h) |
|---|---|---|---|---|---|
| 1 | 1.6 ± 0.2 | not measured (n.m.) | 3.1 ± 0.6 | 1.6 ± 0.1 | n.m. |
| 2 | 2.0 ± 0.2 | >168 | 4.6 ± 0.9 | 2.0 ± 0.3 | >168 |
| 3 | 1.8 ± 0.1 | n.m. | 4.1 ± 0.9 | 1.9 ± 0.1 | n.m. |
| 4 | 1.3 ± 0.1 | >168 | 1.6 ± 0.3 | 1.3 ± 0.2 | >168 |
| 5 | 1.4 ± 0.1 | >168 | 2.1 ± 0.4 | 1.3 ± 0.1 | >168 |
| 6 | 1.4 ± 0.1 | >168 | 2.4 ± 0.4 | 1.2 ± 0.1 | >168 |
| 7 | 1.4 ± 0.1 | >168 | 1.7 ± 0.3 | 1.4 ± 0.1 | >168 |
| 8 | 2.9 ± 0.2 | >168 | n.m. | 2.8 ± 0.2 | >168 |
| 9 | 1.9 ± 0.2 | n.m. | n.m. | 1.7 ± 0.2 | n.m. |
| 10 | 2.7 ± 0.2 | n.m. | 7.0 ± 1.1 | 2.6 ± 0.3 | n.m. |
| 11 | 2.9 ± 0.2 | >168 | 4.0 ± 0.9 | 2.8 ± 0.2 | >168 |
| 12 | 3.6 ± 0.4 | n.m. | 5.0 ± 0.9 | 3.8 ± 0.3 | n.m. |
| 13 | 3.0 ± 0.3 | >168 | 4.3 ± 0.9 | 2.9 ± 0.2 | >168 |
| 14 | 4.2 ± 0.4 | n.m. | 9.1 ± 2.1 | 3.5 ± 0.3 | n.m. |
| 15 | 1.8 ± 0.2 | n.m. | 4.1 ± 0.8 | 1.9 ± 0.2 | n.m. |
| 16 | 2.2 ± 0.2 | n.m. | 5.8 ± 1.0 | 2.2 ± 0.1 | n.m. |

Example 2. PSAs from ESO, UNIDYME 18, Benzoic Acid and Itaconic Acid

Benzoic acid (52.5 g), magnesium acetate hydrate (0.55 g) and ESO (307.00 g) are placed in a reactor, and the resulting mixture is stirred and heated at 140° C. for 2 h. Itaconic acid (36.30 g) and 4-methoxyphenol (0.85 g) are then added to the reaction mixture, and the resulting mixture is stirred and heated at 135° C. for 2 h. Subsequently, UNIDYME 18 (96.90 g) is added, and the resulting mixture is stirred and heated at 135° C. for about 6 h to give a viscous polymer. Finally, benzophenone (3.86 g) is dissolved in the polymer to give a viscous resin. The resin is stable in viscosity at 85° C. for at least one day. The resin is coated and UV-cured with the same procedures and parameters as described in Example 1 to give a PSA. The results on the properties of the PSA before and after aging test are summarized in Table 1.

Example 3. PSAs from ESO, UNIDYME 18, Acetic Acid, Adipic Acid and Itaconic Acid Acetic acid (52.9 g) and magnesium acetate hydrate (0.615 g) are placed in a reactor; the resulting mixture is stirred and heated at 40° C. for about 3 min to give a homogeneous solution. ESO (303.90 g) is then added to the reactor, and the resulting mixture is stirred and heated for 1 h at 125° C. and another 1.5 h at 140° C. Afterwards, itaconic acid (33.10 g), adipic acid (13.4 g) and 4-methoxyphenol (0.36 g) are added to the reaction mixture, and the resulting mixture is stirred and heated at 135° C. for 2.5 h. Subsequently, UNIDYME 18 (53.70 g) is added, and the resulting mixture is stirred and heated at 135° C. for about 6 h to give a viscous polymer. Finally, benzophenone (4.42 g) is dissolved in the polymer to give a viscous resin. The resin is stable in viscosity at 103° C. for at least one day. The resin is coated and UV-cured with the same procedures and parameters as described in Example 1 to give a PSA. The results on the properties of the PSA before and after aging test are summarized in Table 1.

Example 4. PSAs from ESO, UNIDYME 18 and Acrylic Acid

Acrylic acid (577.03 g), magnesium acetate hydrate (15.0 g) and 4-methoxyphenol (15.0 g) are placed in a reactor; the resulting mixture is stirred and heated at 40° C. for about 3 min to give a homogeneous solution. ESO (8375.0 g) is then added, and the resulting mixture is stirred and heated for 1 h at 125° C. and another 1 h at 135° C. Subsequently, UNIDYME 18 (8165 g) is added, and the resulting mixture is stirred and heated at 135° C. for 3 h to give a viscous polymer. Finally, benzophenone (165.0 g) is dissolved in the polymer to give a viscous resin. The resin is stable in viscosity at 85° C. for at least one day. The resin is coated on a clear liner and laminated with a BOPP face stock with the same procedures and parameters as described in Example 1. The resulting laminate is then subjected to UV exposure with the UV crosslinker until the peak of the C=C bonds at 810 cm$^{-1}$ in the FTIR spectrum of the resin disappeared. The laminate is measured as a PSA tape for its peel strength, shear strength and loop tack. The results on the properties of the PSA before and after aging test are summarized in Table 1.

Example 5. PSAs from ESO, UNIDYME 18, Acetic Acid and Acrylic Acid

Acrylic acid (45.50 g), magnesium acetate hydrate (2.37 g) and 4-methoxyphenol (1.38 g) are placed in a reactor; the resulting mixture is stirred and heated at 40° C. for about 3 min to give a homogeneous solution. ESO (753.73 g) is then added, and the resulting mixture is stirred and heated for 1 h at 125° C. and another 1 h at 135° C. Afterwards, acetic acid (91.40 g) is added, and the resulting mixture is stirred and heated at 115° C. for 2.5 h. Subsequently, UNIDYME 18 (623 g) is added to the reaction mixture, and the resulting mixture is stirred and heated at 135° C. for 6 h to give a viscous polymer. Finally, benzophenone (14.50 g) is dissolved in the polymer to give a viscous resin. The resin is stable in viscosity at 103° C. for at least one day. The resin is then coated and UV-cured with the same procedures and parameters as described in Example 4 to give a PSA. The results on the properties of the PSA before and after aging test are summarized in Table 1.

Example 6. PSAs from ESO, UNIDYME 18, Acetic Acid and Acrylic Acid

Acrylic acid (13.60 g), acetic acid (14.10 g), magnesium hydroxide (0.10 g) and 4-methoxyphenol (0.68 g) are placed in a reactor; the resulting mixture is stirred and heated at 40° C. for about 5 min. ESO (226.90 g) is then added to the reactor, and the resulting mixture is stirred and heated for 1 h at 125° C. and another 1 h at 135° C. Subsequently, UNIDYME 18 (136.90 g) and another portion of acetic acid (35.10 g) are added, and the resulting mixture is stirred and heated at 125° C. for 2 h and 135° C. for another 5 h to give a viscous polymer. Finally, benzophenone (4.08 g) is dissolved in the polymer to give a viscous resin. The resin is stable in viscosity at 103° C. for at least one day. The resin is then coated and UV-cured with the same procedures and parameters as described in Example 4 to give a PSA. The results on the properties of the PSA before and after aging test are summarized in Table 1.

Example 7. PSAs from ESO, Adipic Acid, Acetic Acid and Acrylic Acid

Acrylic acid (14.30 g), magnesium acetate hydrate (0.45 g) and 4-methoxyphenol (0.535 g) are placed in a reactor;

the resulting mixture is stirred and heated at 40° C. for about 3 min to give a homogeneous solution. ESO (406.0 g) is then added to the reactor, and the resulting mixture is stirred and heated for 1 h at 125° C. Afterwards, acetic acid (56.80 g) is added, and the resulting mixture is stirred and heated at 115° C. for 2.5 h. Subsequently, adipic acid (69.70 g) is added to the reaction mixture, and the resulting mixture is stirred and heated at 135° C. for 7 h to give a viscous polymer. Finally, benzophenone (5.45 g) is dissolved in the polymer to give a viscous resin. The resin is stable in viscosity at 103° C. for at least one day. The resin is then coated and UV-cured with the same procedures and parameters as described in Example 4 to give a PSA. The results on the properties of the PSA before and after aging test are summarized in Table 1.

Example 8. PSAs from ESO, UNIDYME 18, Benzoic Acid and AESO

Benzoic acid (11.13 g), magnesium acetate hydrate (0.15 g) and ESO (69.37 g) are placed in a reactor; the resulting mixture is stirred and heated at 140° C. for 2.5 h. UNIDYME 18 (79.38 g) is then added to the reaction mixture, and the resulting mixture is stirred and heated at 150° C. for 4 h. Subsequently, another portion of ESO (16.40 g) is added, and the resulting mixture is stirred and heated at 140° C. for about 8 h to give a viscous polymer. Finally, AESO (19.5 g) and benzophenone (1.95 g) are blended well with the polymer to give a viscous resin. The resin is then coated on poly(ethylene terephthalate) (PET) film and laminated with clear polyester release liner with the same procedures and parameters as described in Example 1. The resulting laminate is then subjected to UV exposure with the UV crosslinker until the peak of the C=C bonds at 810 cm$^{-1}$ in the FTIR spectrum of the resin disappeared. The laminate is measured as a PSA tape for its peel strength, shear strength and loop tack. The results on the properties of the PSA before and after aging test are summarized in Table 1.

Example 9. PSAs from ESO, Benzoic Acid, Adipic Acid and AESO

Benzoic acid (5.57 g), magnesium acetate hydrate (0.10 g) and ESO (45.04 g) are placed in a reactor; the resulting mixture is stirred and heated at 140° C. for 2.5 h. Adipic acid (11.98 g) is then added to the reaction mixture, and the resulting mixture is stirred and heated at 150° C. for 5 h to give a polymer product. Finally, AESO (8.12 g) and benzophenone (0.70 g) are added, and the resulting mixture is stirred and heated at 130° C. for 1.5 h to give a viscous resin. The resin is then coated and UV-cured with the same procedures and parameters as described in Example 8 to give a PSA. The results on the properties of the PSA before and after aging test are summarized in Table 1.

Example 10. PSAs from ESO, UNIDYME 18, Linoleic Acid and AESO

Linoleic acid (6.81 g), magnesium acetate hydrate (0.10 g) and ESO (40.0 g) are placed in a reactor; the resulting mixture is stirred and heated at 140° C. for 2.5 h. UNIDYME 18 (46.69 g) is then added to the reaction mixture, and the resulting mixture is stirred and heated at 150° C. for 6 h to give a polymer product. Subsequently, AESO (4.9 g) and benzophenone (1.0 g) are added, and the resulting mixture is stirred and heated at 130° C. for 1 h to give a viscous resin. The resin is then coated and UV-cured with the same procedures and parameters as described in Example 8 to give a PSA. The results on the properties of the PSA before and after aging test are summarized in Table 1.

Example 11. PSAs from ESO, Acetic Acid, UNIDYME 18, Ethylenediamine and AESO ESO (272 g), acetic acid (25 g) and triethylamine (2.4 g) are placed in a reaction vessel. The resulting mixture is stirred and heated at 120° C. until the carboxylic acid group of acetic acid are consumed, which takes about 4 h. The resulting product is designated as AA-ESO.

UNIDYME 18 (451 g) is placed in another reaction vessel and heated to 90° C. Ethylenediamine (20.8 g) is then added drop-wise over a period of about 5 min. The resulting mixture is stirred and heated at 120° C. for 0.5 h and then at 155° C. for 2 h. Afterwards, the reaction mixture is purged with nitrogen gas while being stirred and heated at the same temperature for another 0.5 h. Subsequently, AA-ESO (298 g) is added, and the resulting mixture is stirred and heated at 150° C. for about 5.5 h to give a highly viscous polymer. Finally, the polymer is cooled down to about 120° C., and AESO (78.3 g), 4-methoxyphenol (0.85 g) and benzophenone (8.0 g) are then added. The resulting mixture is stirred and heated at 120° C. for about 0.5 h to give a viscous resin. The resin is then coated and UV-cured with the same procedures and parameters as described in Example 8 to give a PSA. The results on the properties of the PSA before and after aging test are summarized in Table 1.

Example 12. PSAs from ESO, Acetic Acid, UNIDYME 18, Ethylenediamine and AESO ESO (49.92 g), acetic acid (8.6 g) and magnesium acetate (0.09 g) are placed in a reaction vessel. The resulting mixture is stirred and heated at 125° C. for 1.5 h and then 140° C. for 1.5 h. The resulting product is designated as AA-ESO.

UNIDYME 18 (67.20 g) is placed in another reaction vessel and heated to 90° C. Ethylenediamine (3.18 g) is then added drop-wise over a period of about 5 min. The resulting mixture is stirred and heated at 120° C. for 0.5 h and then at 155° C. for 2 h. Afterwards, the reaction mixture is purged with nitrogen gas while being stirred and heated at the same temperature for another 0.5 h. Subsequently, AA-ESO (55.52 g) is added, and the resulting mixture is stirred and heated at 150° C. for about 6.5 h to give a highly viscous polymer. Finally, the polymer is cooled down to about 120° C., and AESO (16.45 g), 4-methoxyphenol (0.19 g) and benzophenone (1.25 g) are then added. The resulting mixture is stirred and heated at 120° C. for about 1 h to give a viscous resin. The resin is then coated and UV-cured with the same procedures and parameters as described in Example 8 to give a PSA. The results on the properties of the PSA before and after aging test are summarized in Table 1.

Example 13. PSAs from ESO, Linoleic Acid, UNIDYME 18, Ethylenediamine and AESO ESO (243 g), linoleic acid (76 g) and magnesium acetate (0.6 g) are placed in a reaction vessel. The resulting mixture is stirred and heated at 140° C. until the carboxylic acid group of linoleic acid is consumed, which takes about 2.5 h. The resulting product is designated as LA-ESO.

UNIDYME 18 (418 g) is placed in another reaction vessel and heated to 90° C. Ethylenediamine (19.2 g) is then added drop-wise over a period of about 5 min. The resulting mixture is stirred and heated at 120° C. for 0.5 h and then at 155° C. for 2 h. Afterwards, the reaction mixture is purged with nitrogen gas while being stirred and heated at the same temperature for another 0.5 h. Subsequently, LA-ESO (319 g) is added, and the resulting mixture is stirred and heated at 150° C. for about 5.5 h to give a highly viscous polymer. Finally, the polymer is cooled down to about 120° C., and AESO (54.5 g), 4-methoxyphenol (0.9 g) and benzophenone (7.6 g) are then added. The resulting mixture is stirred and heated at 120° C. for about 1 h to give a viscous resin. The resin is then coated and UV-cured with the same procedures and parameters as described in Example 8 to give a PSA. The results on the properties of the PSA before and after aging test are summarized in Table 1.

Example 14. PSAs from ESO, Linoleic Acid, UNIDYME 18, 1,6-Hexanediamine and AESO ESO (55.55 g), linoleic acid (15.74 g) and magnesium acetate hydrate (0.11 g) are placed in a reaction vessel. The resulting mixture is stirred and heated at 140° C. until the carboxylic acid group of the linoleic acid is consumed, which takes about 2.5 h. The resulting product is designated as LA-ESO.

UNIDYME 18 (100.03 g) and 1,6-hexanediamine (9.17 g) are placed in another reaction vessel, and the resulting mixture is stirred and heated at 110° C. for 1 h and then at 155° C. for 2.5 h. Afterwards, the reaction mixture is purged with nitrogen gas while being stirred and heated at the same temperature for another 1 h. Subsequently, LA-ESO (71.30 g) is added, and the resulting mixture is stirred and heated at 150° C. for about 10 h to give a highly viscous polymer. Finally, the polymer is cooled down to about 120° C., and AESO (5.40 g), 4-methoxyphenol (0.20 g) and benzophenone (1.80 g) are then added. The resulting mixture is stirred and heated at 120° C. for about 1 h to give a viscous resin. The resin is stable in viscosity at 103° C. for at least one day. The resin is then coated and UV-cured with the same procedures and parameters as described in Example 8 to give a PSA. The results on the properties of the PSA before and after aging test are summarized in Table 1.

Example 15. PSAs from ESO, UNIDYME 18, Acetic Acid, Acrylic Acid and Polymercaptan 407

Acrylic acid (4.55 g), magnesium acetate hydrate (0.23 g) and 4-methoxyphenol (0.14 g) are placed in a reactor; the resulting mixture is stirred and heated at 40° C. for 3 min to give a homogeneous solution. ESO (75.40 g) is then added to the reactor, and the resulting mixture is stirred and heated for 1 h at 125° C. and another 1 h at 135° C. Afterwards, acetic acid (9.15 g) is added, and the resulting mixture is stirred and heated at 115° C. for 2.5 h. Subsequently, UNIDYME 18 (62.31 g) is added to the reaction mixture, and the resulting mixture is stirred and heated at 135° C. for 6 h to give a polymer. Finally, polymercaptan 407 (8.22 g) and benzophenone (1.60 g) are dissolved in the polymer to give a viscous resin. The resin is stable in viscosity at 103° C. for at least one day. The resin is then coated and UV-cured with the same procedures and parameters as described in Example 4 to give a PSA. The results on the properties of the PSA before and after aging test are summarized in Table 1.

Example 16. PSAs from ESO, UNIDYME 18, Adipic Acid, Itaconic Acid, and Polymercaptan 407

Acetic acid (52.9 g) and magnesium acetate hydrate (0.615 g) are placed in a reactor. The resulting mixture is stirred and heated at 40° C. for 3 min to give a homogeneous solution. ESO (303.90 g) is then added to the reactor, and the resulting mixture is stirred and heated for 1 h at 125° C. and another 1.5 h at 140° C. Afterwards, itaconic acid (33.10 g), adipic acid (13.4 g) and 4-methoxyphenol (0.36 g) are added, and the resulting mixture is stirred and heated at 135° C. for 2.5 h. Subsequently, UNIDYME 18 (53.70 g) is added, and the resulting mixture is stirred and heated at 135° C. for about 6 h to give a viscous polymer. Finally, polymercaptan 407 (61.25 g) and benzophenone (4.42 g) are blended well with the polymer to give a viscous resin. The resin is stable in viscosity at 103° C. for at least one day. The resin is then coated and UV-cured with the same procedures and parameters as described in Example 1 to give a PSA. The results on the properties of the PSA before and after aging test are summarized in Table 1.

In view of the many possible embodiments to which the principles of the disclosed invention may be applied, it should be recognized that the illustrated embodiments are only preferred examples of the invention and should not be taken as limiting the scope of the invention.

What is claimed is:

1. A pressure sensitive adhesive composition comprising a crosslinked polyester made by step-growth polymerizing (a) at least one epoxidized plant oil, at least one epoxidized animal fat, or a mixture thereof, (b) at least one dicarboxylic acid, at least one polycarboxylic acid, or a mixture thereof, and (c) at least one compound that contains both one carbon-carbon double bond (C=C) and at least one carboxylic acid group to form a polyester that includes 0.05 to 2 pendant C=C bonds per polyester molecule; adding at least one photoinitiator; and subjecting the resulting resin to ultraviolet radiation such that the at least one photoinitiator generates free radicals to form the crosslinked polyester.

2. The pressure sensitive adhesive composition of claim 1, wherein component (a) is monocarboxylic acid-modified epoxidized soybean oil.

3. The pressure sensitive adhesive composition of claim 2, wherein the monocarboxylic acid modifier is formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachildic acid, heneicosylic acid, behenic acid, tricosylic acid, lignoceric acid, naphthalene acid, oleic acid, linoleic acid, myristoleic acid, palmitoleic acid, sapienic acid, elaidic acid, vaccenic acid, linoelaidic acid, linolenic acid, arachidonic acid, eicosapentaenoic acid, erucic acid, docosahexanenoic acid, abietic acid or tall oil rosin that contains abietic acid, benzoic acid, phenylacetic acid, 1-naphthaleneacetic acid, 2-naphthaleneacetic acid, 1-naphthoic acid, 2-naphthoic acid, 2-furoic acid, 3-methylpyridine-2-carboxylic acid, 1-methylpyrrole-2-carboxylic acid, pyrimidine-2-carboxylic acid, or an anhydride thereof, or a mixture thereof.

4. The pressure sensitive adhesive composition of claim 2, wherein component (c) is itaconic acid, fumaric acid, maleic acid, or an anhydride thereof, or a mixture thereof.

5. The pressure sensitive adhesive composition of claim 4, wherein component (b) is a mixture of dimer acid, trimer acid, and polymeric fatty acid, adipic acid, or a polymer or an oligomer that is capped with —COOH groups at chain ends of the polymer or the oligomer.

6. The pressure sensitive adhesive composition of claim 2, wherein component (c) is itaconic acid.

7. The pressure sensitive adhesive composition of claim 2, wherein a reaction mixture of the (a) monocarboxylic acid-modified epoxidized soybean oil, component (b), and component (c) is formed, and the reaction mixture is heated in the presence of a catalyst to form the polyester that that includes the 0.05 to 2 pendant C═C bonds per polyester molecule.

8. The pressure sensitive adhesive composition of claim 1, wherein component (a) is epoxidized soybean oil.

9. The pressure sensitive adhesive composition of claim 8, wherein component (c) is itaconic acid, fumaric acid, maleic acid, or an anhydride thereof, or a mixture thereof.

10. The pressure sensitive adhesive composition of claim 9, wherein component (b) is a mixture of dimer acid, trimer acid, and polymeric fatty acid, adipic acid, or a polymer or an oligomer that is capped with —COOH groups at chain ends of the polymer or the oligomer.

11. The pressure sensitive adhesive composition of claim 8, wherein component (c) is itaconic acid.

12. The pressure sensitive adhesive composition of claim 1, wherein component (b) is malonic acid, succinic acid, glutaric acid, adipic acid, pimelic acid, suberic acid, azelaic acid, sebacic acid, brassylic acid, phthalic acid, isophthalic acid, terephthalic acid, dimer acid, trimer acid, or an anhydride thereof, or a mixture thereof.

13. The pressure sensitive adhesive composition of claim 1, wherein component (b) is a mixture of dimer acid, trimer acid, and polymeric fatty acid.

14. The pressure sensitive adhesive composition of claim 1, wherein component (b) is adipic acid.

15. The pressure sensitive adhesive composition of claim 1, wherein component (b) is a polymer or an oligomer that is capped with —COOH groups at chain ends of the polymer or the oligomer.

16. The pressure sensitive adhesive composition of claim 1, wherein component (c) is itaconic acid, fumaric acid, maleic acid, or an anhydride thereof, or a mixture thereof.

17. The pressure sensitive adhesive composition of claim 1, wherein component (c) is itaconic acid.

18. The pressure sensitive adhesive composition of claim 1, wherein component (c) is acrylic acid, methacrylic acid, or an anhydride thereof, or a mixture thereof.

19. The pressure sensitive adhesive composition of claim 1, wherein component (c) is acrylic acid.

20. The pressure sensitive adhesive composition of claim 1, wherein component (a) is initially reacted with component (c) to form a modified component (a) that includes at least one pendant C═C bond; and the modified component (a) is subsequently reacted with component (b) in the presence of a catalyst to form the polyester that that includes the 0.05 to 2 pendant C═C bonds per polyester molecule.

* * * * *